United States Patent
Jung et al.

(10) Patent No.: US 11,340,759 B2
(45) Date of Patent: May 24, 2022

(54) USER TERMINAL DEVICE WITH PEN AND CONTROLLING METHOD THEREOF

(71) Applicant: SAMSUNG ELECTRONICS CO., LTD., Suwon-si (KR)

(72) Inventors: Jong-woo Jung, Hwaseong-si (KR); In-sik Myung, Incheon (KR); Taik-heon Rhee, Seoul (KR); Dong-bin Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 16/389,417

(22) Filed: Apr. 19, 2019

(65) Prior Publication Data

US 2019/0243517 A1    Aug. 8, 2019

Related U.S. Application Data

(63) Continuation of application No. 14/244,240, filed on Apr. 3, 2014, now Pat. No. 10,289,268.

(30) Foreign Application Priority Data

Apr. 26, 2013 (KR) .................. 10-2013-0046995
Aug. 19, 2013 (KR) .................. 10-2013-0097737

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0488* (2013.01); *G06F 3/04883* (2013.01);
(Continued)

(58) Field of Classification Search
CPC ............... G06F 3/0482; G06F 3/04883; G06F 2203/04807; G06F 2200/1632;
(Continued)

(56) References Cited

U.S. PATENT DOCUMENTS 5,231,381 A   7/1993  Duwaer
5,956,020 A   9/1999  D'Amico et al.
(Continued)

FOREIGN PATENT DOCUMENTS

CN   101308417 A   11/2008
CN   101523331 A    9/2009
(Continued)

OTHER PUBLICATIONS

Communication dated Nov. 6, 2017, issued by The State Intellectual Property Office of P.R. China in counterpart Chinese application No. 201480023750.9.
(Continued)

*Primary Examiner* — Steven B Theriault
(74) *Attorney, Agent, or Firm* — Sughrue Mion, PLLC

(57) ABSTRACT

A user terminal device capable of attaching and detaching a pen is provided. The device includes a detector configured to detect a user manipulation regarding a screen, and a controller configured to change a layout of the screen to correspond to a pen use mode in response to the pen being removed from the user terminal device, perform a control operation corresponding to the detected user manipulation in response to the user manipulation using the pen being detected, and restore the layout of the screen to its original state in response to the pen being remounted on the user terminal apparatus.

20 Claims, 32 Drawing Sheets

(51) Int. Cl.
*G06F 3/04883* (2022.01)
*G06F 3/0488* (2022.01)

(52) U.S. Cl.
CPC .............. G06F 2203/04806 (2013.01); *G06F 2203/04807* (2013.01)

(58) Field of Classification Search
CPC ...... G06F 3/033; G06F 3/0412; G06F 3/0416; G06F 3/0481; G06F 3/0484; G06F 3/04845; G06F 3/0488; G06F 3/03545; G06F 2203/04808; G06F 3/04847; G06F 3/0486; G06F 9/451
See application file for complete search history.

(56) References Cited

U.S. PATENT DOCUMENTS

| | | | |
|---|---|---|---|
| 6,204,837 B1* | 3/2001 | Smith | G06F 3/038 345/156 |
| 6,233,464 B1 | 5/2001 | Chmaytelli | |
| 6,438,523 B1* | 8/2002 | Oberteuffer | G06F 3/038 704/270 |
| 6,611,258 B1* | 8/2003 | Tanaka | G06F 3/0433 345/173 |
| 6,683,628 B1* | 1/2004 | Nakagawa | G06F 3/0485 345/672 |
| 6,727,892 B1* | 4/2004 | Murphy | G06F 3/04842 178/18.01 |
| 6,956,562 B1 | 10/2005 | O'Hara et al. | |
| 7,102,626 B2* | 9/2006 | Denny, III | G06F 1/1626 345/179 |
| 7,656,393 B2 | 2/2010 | King | |
| 7,802,202 B2* | 9/2010 | Fox | G06F 3/0488 715/831 |
| 8,094,173 B2 | 1/2012 | Lee | |
| 8,094,938 B2* | 1/2012 | Wang | G06F 3/04883 382/185 |
| 8,130,206 B2* | 3/2012 | Lindroos | H04M 1/67 345/173 |
| 8,135,956 B2 | 3/2012 | Balfanz | |
| 8,265,382 B2* | 9/2012 | Edgecomb | G06F 40/169 382/165 |
| 8,296,681 B2* | 10/2012 | Nurmi | G06F 3/0482 715/845 |
| 8,330,733 B2 | 12/2012 | Petschnigg | |
| 8,456,442 B2 | 6/2013 | Kao | |
| 8,456,451 B2 | 6/2013 | Morrison | |
| 8,477,107 B2* | 7/2013 | Chiang | G06F 3/04883 345/173 |
| 8,487,883 B2 | 7/2013 | Kao | |
| 8,587,526 B2* | 11/2013 | Engelhardt | G06F 3/0416 345/173 |
| 8,605,043 B2* | 12/2013 | Chang | G06F 3/0488 345/173 |
| 8,704,767 B2 | 4/2014 | Dodge | |
| 8,904,291 B2* | 12/2014 | Kim | H04M 3/567 715/748 |
| 8,943,092 B2* | 1/2015 | Dai | G06F 16/2455 707/769 |
| 8,954,099 B2 | 2/2015 | Forutanpour | |
| 8,988,357 B2* | 3/2015 | Hope | G06F 3/02 345/173 |
| 8,997,015 B2* | 3/2015 | Kinoshita | G06F 3/04842 715/781 |
| 9,063,591 B2 | 6/2015 | Alameh | |
| 9,256,314 B2 | 2/2016 | Durojaiye | |
| 9,292,116 B2 | 3/2016 | Mann | |
| 9,411,442 B2* | 8/2016 | Alameh | G06F 3/041 |
| 9,436,301 B2 | 9/2016 | Krahenbuhl | G06F 3/0416 |
| 9,497,634 B2 | 11/2016 | Kim | |
| 9,696,899 B2* | 7/2017 | Kim | G06F 1/1616 |
| 9,836,154 B2 | 12/2017 | Chang | |
| 9,836,214 B2 | 12/2017 | Kinoshita | |
| 9,851,867 B2 | 12/2017 | Nakazawa et al. | |
| 9,870,083 B2* | 1/2018 | Hinckley | G06F 3/03545 |
| 9,983,785 B2* | 5/2018 | Wong | G06F 3/04886 |
| 2001/0013861 A1 | 8/2001 | Shimizu | |
| 2002/0011993 A1* | 1/2002 | Lui | G06F 3/04883 345/179 |
| 2002/0080123 A1 | 6/2002 | Kennedy | |
| 2002/0103616 A1 | 8/2002 | Park | |
| 2003/0123733 A1* | 7/2003 | Keskar | G06K 9/222 382/187 |
| 2004/0051700 A1 | 3/2004 | Pensjo | |
| 2004/0095333 A1* | 5/2004 | Morag | G06F 3/03545 345/173 |
| 2004/0100479 A1* | 5/2004 | Nakano | G06F 3/0362 715/700 |
| 2004/0105040 A1 | 6/2004 | Oh | |
| 2004/0155871 A1* | 8/2004 | Perski | G06F 3/0442 345/174 |
| 2005/0022130 A1* | 1/2005 | Fabritius | G06F 3/04883 715/739 |
| 2005/0051623 A1* | 3/2005 | Okuda | G01C 21/20 235/384 |
| 2005/0071761 A1* | 3/2005 | Kontio | G06F 3/0488 715/711 |
| 2005/0091609 A1 | 4/2005 | Matthews | |
| 2005/0114778 A1 | 5/2005 | Branson | |
| 2005/0134578 A1* | 6/2005 | Chambers | G06F 3/0486 345/184 |
| 2005/0179647 A1 | 8/2005 | Simmons | |
| 2006/0012580 A1 | 1/2006 | Perski | |
| 2006/0033719 A1 | 2/2006 | Leung et al. | |
| 2006/0050061 A1 | 3/2006 | Aiken | |
| 2006/0067577 A1* | 3/2006 | Marggraff | G06K 9/00422 382/187 |
| 2006/0080621 A1* | 4/2006 | Park | G06F 3/04883 715/788 |
| 2006/0227106 A1* | 10/2006 | Hashimoto | G06F 3/0482 345/157 |
| 2006/0227116 A1* | 10/2006 | Zotov | G06F 3/0418 345/173 |
| 2006/0279559 A1* | 12/2006 | Kongqiao | G06F 3/04883 345/179 |
| 2007/0063994 A1 | 3/2007 | Carlson | |
| 2007/0075976 A1 | 4/2007 | Kun | |
| 2007/0180400 A1* | 8/2007 | Zotov | G06F 3/04845 715/788 |
| 2007/0236468 A1 | 10/2007 | Tuli | |
| 2007/0242056 A1 | 10/2007 | Engelhardt et al. | |
| 2008/0001924 A1 | 1/2008 | de los Reyes | |
| 2008/0128180 A1* | 6/2008 | Perski | G06F 3/046 178/18.03 |
| 2008/0141168 A1 | 6/2008 | Ryan | |
| 2008/0154573 A1* | 6/2008 | Jarrett | G06F 3/038 703/23 |
| 2008/0186285 A1 | 8/2008 | Shimizu | |
| 2008/0266255 A1* | 10/2008 | Lawson | G06F 3/038 345/163 |
| 2008/0284743 A1* | 11/2008 | Hsu | G06F 3/0488 345/173 |
| 2008/0284753 A1 | 11/2008 | Hsu | |
| 2009/0167727 A1* | 7/2009 | Liu | G06F 3/044 345/179 |
| 2009/0187855 A1 | 7/2009 | Gruen | |
| 2009/0197615 A1 | 8/2009 | Kim | |
| 2009/0247112 A1* | 10/2009 | Lundy | G06F 3/0486 455/404.1 |
| 2009/0249247 A1 | 10/2009 | Tseng et al. | |
| 2009/0251432 A1* | 10/2009 | Wang | G06F 3/04883 345/173 |
| 2009/0315922 A1 | 12/2009 | Lee | |
| 2010/0007613 A1* | 1/2010 | Costa | G06F 3/0488 345/173 |
| 2010/0026642 A1* | 2/2010 | Kim | G06F 3/0416 345/173 |
| 2010/0083190 A1 | 4/2010 | Roberts | |
| 2010/0095205 A1 | 4/2010 | Kinoshita | |

(56) References Cited

U.S. PATENT DOCUMENTS

| | | | |
|---|---|---|---|
| 2010/0110025 A1* | 5/2010 | Lim | G06F 3/03547 345/173 |
| 2010/0138765 A1 | 6/2010 | Rainisto | |
| 2010/0182247 A1* | 7/2010 | Petschnigg | G06F 3/0486 345/173 |
| 2010/0194693 A1* | 8/2010 | Selin | G06F 3/0488 345/173 |
| 2010/0207897 A1* | 8/2010 | Ono | H01Q 1/242 345/173 |
| 2010/0235732 A1* | 9/2010 | Bergman | G06F 3/0488 715/702 |
| 2010/0262591 A1* | 10/2010 | Lee | G06F 3/04842 707/706 |
| 2011/0012849 A1* | 1/2011 | Cho | G06F 1/3203 345/173 |
| 2011/0041101 A1 | 2/2011 | Choi | |
| 2011/0041102 A1* | 2/2011 | Kim | G06F 3/0488 715/863 |
| 2011/0050610 A1* | 3/2011 | Pearce | G06F 3/046 345/173 |
| 2011/0066984 A1* | 3/2011 | Li | G06K 9/3208 715/863 |
| 2011/0099299 A1* | 4/2011 | Vasudevan | G06F 3/048 710/14 |
| 2011/0175834 A1 | 7/2011 | Han | |
| 2011/0175842 A1* | 7/2011 | Miura | H04M 1/72583 345/173 |
| 2011/0191712 A1* | 8/2011 | Machida | G06F 3/0488 715/788 |
| 2011/0205163 A1 | 8/2011 | Hinckley | |
| 2011/0209098 A1 | 8/2011 | Hinckley | |
| 2011/0216032 A1* | 9/2011 | Oda | G06F 3/0446 345/174 |
| 2011/0304550 A1 | 12/2011 | Romera | |
| 2011/0307840 A1 | 12/2011 | Harris et al. | |
| 2012/0007825 A1 | 1/2012 | Kim | |
| 2012/0154295 A1* | 6/2012 | Hinckley | G06F 3/04883 345/173 |
| 2012/0182322 A1* | 7/2012 | Yeh | G06F 3/04883 345/660 |
| 2012/0190408 A1* | 7/2012 | Ferren | G06K 9/00906 455/566 |
| 2012/0212421 A1 | 8/2012 | Honji | |
| 2012/0212440 A1* | 8/2012 | Nishida | G06F 3/04883 345/173 |
| 2012/0218177 A1 | 8/2012 | Pang | |
| 2012/0302167 A1* | 11/2012 | Yun | G06F 3/0416 455/41.2 |
| 2012/0306927 A1* | 12/2012 | Lee | G06F 3/041 345/660 |
| 2012/0313865 A1* | 12/2012 | Pearce | G06F 3/04883 345/173 |
| 2012/0315960 A1 | 12/2012 | Kim | |
| 2013/0050141 A1* | 2/2013 | Park | G06F 3/03545 345/174 |
| 2013/0135220 A1 | 5/2013 | Alameh | |
| 2013/0151963 A1 | 6/2013 | Costenaro | |
| 2013/0167065 A1 | 6/2013 | Chen | |
| 2013/0212535 A1 | 8/2013 | Kim | |
| 2013/0222294 A1* | 8/2013 | Choi | G06F 3/0416 345/173 |
| 2013/0257793 A1* | 10/2013 | Zeliff | G06F 3/044 345/174 |
| 2013/0268401 A1* | 10/2013 | Choi | G06Q 30/0641 705/26.8 |
| 2013/0298054 A1 | 11/2013 | Nakazawa et al. | |
| 2014/0026101 A1 | 1/2014 | Pallakoff | |
| 2014/0189606 A1 | 7/2014 | Shuttleworth | |
| 2014/0253464 A1 | 9/2014 | Hicks | |
| 2014/0267078 A1 | 9/2014 | Kukulski | |
| 2014/0267130 A1* | 9/2014 | Hwang | G06F 3/0488 345/174 |
| 2014/0368473 A1 | 12/2014 | Chang | |
| 2015/0138127 A1* | 5/2015 | Kurita | G06F 3/03545 345/173 |
| 2015/0199036 A1* | 7/2015 | Akitomo | G06F 3/0412 345/173 |
| 2015/0220267 A1 | 8/2015 | Kinoshita | |

FOREIGN PATENT DOCUMENTS

| | | |
|---|---|---|
| CN | 101609389 A | 12/2009 |
| CN | 102227706 A | 10/2011 |
| CN | 102917117 A | 2/2013 |
| EP | 1 962 480 A2 | 8/2008 |
| EP | 2 204 724 A1 | 7/2010 |
| EP | 2 565 752 A1 | 3/2013 |
| GN | 101836179 A | 9/2010 |
| JP | 2012-88799 A | 5/2012 |
| KR | 1020100063889 A | 6/2010 |
| KR | 1020120137820 A | 12/2012 |
| WO | 2010/061037 A1 | 6/2010 |

OTHER PUBLICATIONS

Communication dated Feb. 26, 2018 issued by the European Patent Office in counterpart Application No. 14 787 678.3.

Communication dated Jan. 25, 2017, issued by the European Patent Office in counterpart European application No. 14787678.3.

Communication dated May 23, 2018, issued by the State Intellectual Property Office of P.R. China in counterpart Chinese Application No. 201480023750.9.

Communication (Written Opinion) dated Aug. 21, 2014, issued by the International Searching Authority in counterpart International Application No. PCT/KR2014/003642.

Communication dated Nov. 23, 2018, from the State Intellectual Property Office of People's Republic of China in counterpart Application No. 201480023750.9.

Communication dated Oct. 19, 2018, from the European Patent Office in counterpart European Application No. 14787678.3.

Communication dated Aug. 21, 2014, issued by the International Searching Authority in counterpart International Application No. PCT/KR2014/003642.

Communication dated Nov. 4, 2019 issued by the State Intellectual Property Office of P R. China in counterpart Chinese Application No. 201480023750.9.

Communication dated Dec. 5, 2019 issued by the Indian Intellectual Property Office in Indian counterpart Application No. 2959/MUMNP/2015.

Communication dated Jan. 10, 2020 issued by the Korean Intellectual Property Office in counterpart Korean Application No. 10-2013-0097737.

Communication dated Jan. 20, 2020 issued by the European Intellectual Property Office in counterpart European Application No. 19200854.8.

Communication dated Jun. 12, 2019, issued by the State Intellectual Property Office of P.R. China in counterpart Chinese Application No. 201480023750.9.

Communication dated Nov. 4, 2021, issued by the European Patent Office in counterpart European Application No. 19200854.8.

\* cited by examiner (A) WHEN PEN IS ATTACHED (B) WHEN PEN IS DETACHED (A) WHEN PEN IS ATTACHED (B) WHEN PEN IS DETACHED (A) WHEN PEN IS ATTACHED (B) WHEN PEN IS DETACHED (A) WHEN PEN IS ATTACHED (B) WHEN PEN IS DETACHED (A) WHEN PEN IS ATTACHED (B) WHEN PEN IS DETACHED (A) WHEN PEN IS ATTACHED (B) WHEN PEN IS DETACHED

USER TERMINAL DEVICE WITH PEN AND CONTROLLING METHOD THEREOF

CROSS-REFERENCE TO RELATED APPLICATIONS

This application is a Continuation Application of U.S. application Ser. No. 14/244,240, filed on Apr. 3, 2014, which claims priority from Korean Patent Application Nos. 10-2013-0046995, filed in the Korean Intellectual Property Office on Apr. 26, 2013, and 10-2013-0097737, filed in the Korean Intellectual Property Office on Aug. 19, 2013, the disclosures of which are incorporated herein by reference.

BACKGROUND

1. Field

Aspects of the exemplary embodiments relate to a user terminal device and a controlling method thereof. In particular, exemplary embodiments relate to a user terminal device capable of performing various control operations using a pen and a controlling method thereof.

2. Description of the Related Art

With the development of electronic technologies, various types of electronic apparatuses have been developed and distributed. In particular, a lot of portable user terminal devices such as a mobile phone, a tablet PC, a laptop PC, etc., have been widely developed and distributed.

These user terminal devices may provide a plurality of services using various applications. A user may execute a desired application by selecting an icon displayed on a home screen or an application icon screen.

The home screen refers to a screen which is displayed for the first time when the user terminal device is turned on in a usable state.

A user may set the home screen such that icons corresponding to various desirable functions, content icons, widgets, etc., may be displayed on the home screen. The user may perform control operations corresponding to each icon by touching the icons displayed on the screen using his or her finger.

A related art user terminal device, which is capable of performing control operations using a plurality of inputters such as a pen instead of a finger, has been distributed. However, in the related art user terminal device, no difference can be found between a finger and a pen when it comes to performing control operations.

Thus, a technology is required for allowing a user to perform control operations using a pen more conveniently and effectively.

SUMMARY

An aspect of the exemplary embodiments relates to a user terminal device which provides a user interaction for performing control operations using a pen more conveniently and swiftly, and a controlling method thereof.

According to an aspect of an exemplary embodiment, a user terminal device capable of attaching and detaching a pen and performing a user input through a plurality of inputters includes a display configured to display a screen including a plurality of objects, a detector configured to detect a user manipulation through the inputters, and a controller configured to arrange and display a plurality of objects on a screen according to a first layout in response to a first inputter being used, among the plurality of inputters, and to re-arrange and display the plurality of objects on the screen, the objects being previously arranged according to the first layout, according to a second layout in response to a second inputter being used, among the plurality of inputters.

The second inputter may be a pen, and the controller may be configured to detect whether the pen is removed from the user terminal device and arrange the plurality of objects according to the second layout.

The first layout and the second layout may be different from each other in terms of display attributes of the plurality of objects.

The screen may include a menu area configured to display at least one menu which is selectable by the pen and a content display area configured to display at least one content, and the controller may reduce a size of the menu area and enlarge a size of the content display area to display the screen according to the second layout in response to the pen being removed from the user terminal device, and the controller is configured to restore the size of the menu area and the size of the content display area to the screen according to the first layout in response to the pen being mounted in the user terminal device.

The controller may be configured to reduce a size of each object of the objects, and increase a number of total objects displayed on the screen.

The screen may include an indicator area configured to display at least one indicator, and the controller, may perform a control operation corresponding to a selected indicator in response to one of the at least one indicator displayed on the indicator area being selected by the pen.

The controller may be configured to change a shape of a selected indicator to a shape corresponding to another mode, and convert a current mode of the user terminal device to the another mode in response to an indicator corresponding to a current mode of the user terminal being selected by the pen.

The controller may be configured to display a first quick panel screen in response to a general touch dragging manipulation being detected from an edge area of the screen towards a center of the screen, and the controller may be configured to display a second quick panel screen in response to pen dragging manipulation being detected from the edge area of the screen towards the center area of the screen.

The controller may be configured to perform a control operation which is matched with a tap according to a predetermined pattern of a detected pen manipulation in response to a pen manipulation in the predetermined pattern being detected on the tap displayed on the second quick panel screen.

The first quick panel screen and the second quick panel screen may be configured to display at least one respective notification item, and the controller may be configured to perform a control operation corresponding to a notification item and a note-taking automatically in response to the note-taking being performed using the pen on the notification item displayed on the second quick panel screen.

According to another aspect of an exemplary embodiment, a method for controlling a user terminal device includes, displaying a screen which includes a plurality of objects arranged according to a first layout in response to a pen being mounted on the user terminal device, changing the screen by re-arranging the plurality of objects on the screen, the objects being previously arranged according to the first layout, according to a second layout in response to the pen being removed from the user terminal device, and rearranging the plurality of objects on the screen according to the first layout in response to the pen being mounted again on the user terminal device.

The screen may include a menu area configure to display at least one menu which is selectable by the pen and a content display area configured to display at least one content, and the changing the screen may include reducing a size of the menu area and enlarging a size of the content display area in response to the pen being removed from the user terminal device.

The changing the screen may include reducing a size of each object of the objects, and increasing a number of total objects displayed on the screen in response to the pen being removed from the user terminal device.

The screen may include an indicator area configured to display at least one indicator, and the method may further include performing a control operation corresponding to a selected indicator in response to one of the at least one indicator displayed on the indicator area being selected by the pen.

The method may further include changing a shape of a selected indicator to a shape corresponding to another mode, and converting a current mode of the user terminal device to the another mode in response to an indicator corresponding to the current mode of the user terminal device being selected by the pen.

The method may further include displaying a first quick panel screen in response to a general touch dragging manipulation being detected from an edge area of the screen towards a center area of the screen, and displaying a second quick panel screen in response to a pen manipulation of dragging being detected from the edge area of the screen towards the center area of the screen.

The method may further include performing a control operation which is matched with a tap according to a predetermined pattern of a detected pen manipulation in response to a pen manipulation in the predetermined pattern being detected on the tap displayed on the second quick panel screen.

The method may further include performing a control operation corresponding to a notification item and a note-taking automatically in response to the note-taking being performed using the pen on the notification item displayed on the second quick panel screen.

According to another aspect of an exemplary embodiment, a user terminal device capable of attaching and detaching a pen includes a display configured to display a screen including an indicator area composed of a plurality of indicators corresponding to an operation state of the user terminal device, a detector configured to detect a user manipulation, and a controller configured to operate in a general mode in response to the pen being mounted on the user terminal device, and to operate in a pen use mode in response to the pen being removed from the user terminal device, and the controller is further configured to disregard a touch in response to the touch being input in the general mode to select a plurality of indicators, and to perform a control operation corresponding to a touched indicator in response to one of the plurality of indicators being touched by the pen in the pen use mode.

The indicator area may include at least one of a first indicator to notify a missed call, a second indicator to notify a newly-received message or a messenger, a third indicator to notify a program update, a fourth indicator to notify a current communication method, a fifth indicator to notify a communication state, a sixth indicator to notify a residual battery, a seventh indicator to notify whether an alarm is set, an eighth indicator to notify time, a ninth indicator to notify date, a tenth indicator to notify weather information, an eleventh indicator to notify that a predetermined schedule has come, a twelfth indicator to notify an operation mode of the user terminal device, a thirteenth indicator to notify whether it is a vibration mode, and a fourteenth indicator to notify whether Bluetooth is used.

According to another aspect of an exemplary embodiment, a user terminal device capable of attaching and detaching a pen includes a display configured to display a home screen which divided into a plurality of pages and is convertible by page unit, a detector configured to detect a user manipulation, and a controller configured to convert and display the home screen by the page unit according to the user manipulation in response to the pen being mounted on the user terminal device, and to reduce each size of the plurality of pages and display entire pages within a single home screen, and at least one object is displayed on each page of the home screen.

The controller may be configured to move the object to another page according to a pen manipulation in response to the pen manipulation for moving the object included in one page to the another page being detected while the entire pages are displayed on the single home screen.

According to another exemplary embodiment, a user terminal device capable of attaching and detaching a pen includes a display configured to display a screen including a widget, a detector configured to detect a user manipulation, and a controller configured to operate in a general mode in response to the pen being mounted on the user terminal device, and to operate in a pen use mode in response to the pen being removed from the user terminal device, and the controller is configured to execute a program corresponding to the widget in response to a touch being input on the widget in the general mode, and to adjust setting data of the widget according to a pen manipulation and change a displayed content of the widget according to the adjusted setting data in response to the pen manipulation regarding the widget being input in the pen use mode.

The widget may be a widget in a form of an analog clock including a hour hand and a minute hand, and the controller may be configured to set an alarm based on a time changed according to a pen manipulation in response to the pen manipulation being input for moving at least one of the hour hand and the minute hand on the analog clock, and move at least one of the hour hand and the minute hand to a time when the alarm is set.

According to an aspect of an exemplary embodiment, a user terminal device capable of attaching and detaching a pen includes a display configured to display a screen including a plurality of objects, a detector configured to detect a user manipulation regarding the screen, and a controller configured to arrange the plurality of objects on the screen according to a first layout in response to the pen being mounted on the user terminal device, and to change the screen by rearranging the plurality of objects according to a second layout corresponding to a pen use mode in response to the pen being removed from the user terminal device, and the controller is configured to perform a control operation corresponding to a selected object in response to at least one of the plurality of objects being selected by the pen while the screen, which is changed according to the second layout, is being displayed, and the controller is configured to rearrange the plurality of objects according to the first layout in response to the pen being re-mounted on the user terminal device.

According to yet another exemplary embodiment, a method of controlling a user terminal device includes displaying a screen, displaying a first quick panel on the screen for setting an operation or one of a plurality of main functions of the user terminal device in response to determining that a first input is dragged from a border of the screen towards a center of the screen, and displaying a second quick panel on the screen for setting one of a plurality of minute control operations in response to determining that a second input is dragged from the border of the screen towards the center of the screen. The first input is different from the second input.

According to the above-described various exemplary embodiments, a user interaction method which is appropriate for using a pen may be provided. Accordingly, the function of the user terminal device may be controlled more easily and conveniently.

BRIEF DESCRIPTION OF THE DRAWINGS

The above and/or other aspects of the exemplary embodiments will be more apparent by describing certain exemplary embodiments t with reference to the accompanying drawings, in which.

DETAILED DESCRIPTION OF THE EXEMPLARY EMBODIMENTS

The method steps and system components have been represented by related art symbols in the figure, and only specific details which are relevant for an understanding of the exemplary embodiments have been shown. Further, details which have not been disclosed may be readily apparent to a person of ordinary skilled in the art. In the exemplary embodiments, relational terms such as first and second, etc., may be used to distinguish one entity from another entity, without necessarily implying any actual relationship or order between such entities.

Figure 1:
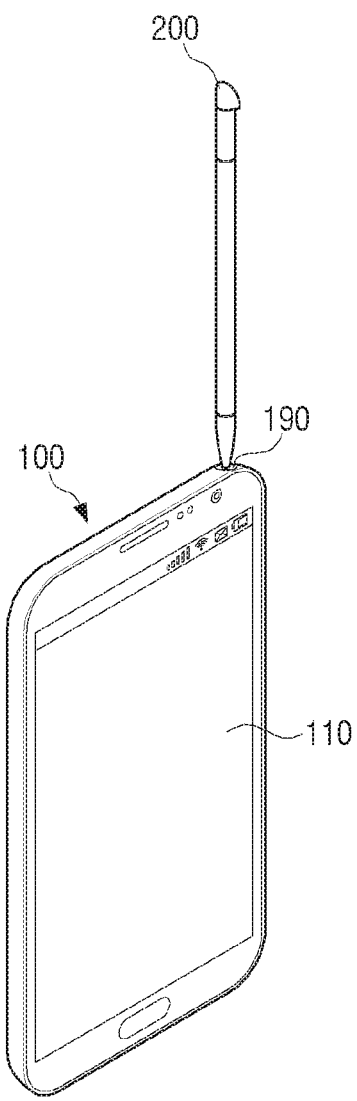
FIG. 1 is a view illustrating external configuration of a user terminal device according to an exemplary embodiment.

FIG. 1 is a view illustrating an external configuration of a user terminal device according to an exemplary embodiment. According to FIG. 1, a display 110 is disposed on the front of a user terminal device 100, and a pen fixing unit 190 is provided on one side. A pen 200 may be mounted in the pen fixing unit 190.

In FIG. 1, the pen fixing unit 190 is provided in the form of a hole such that a pen 200 may be inserted therein. However, the pen fixing unit 190 may be realized in other forms. For example, the pen fixing unit 190 may be formed on the side of the user terminal device 100 so as to fix the pen 200 in the fixed clip form.

The user terminal device 100 refers to various types of electronic devices which may be arbitrarily used by a user. In FIG. 1, the user terminal device 100 is illustrated as a mobile phone, but the types of the user terminal device 100 may be realized in many different ways. To be specific, the user terminal device 100 may be realized as various types of devices such as mobile phone, tablet PC, laptop PC, PDA, MP3 player, electronic album device, TV, PC, kiosk, etc.

Figure 2:
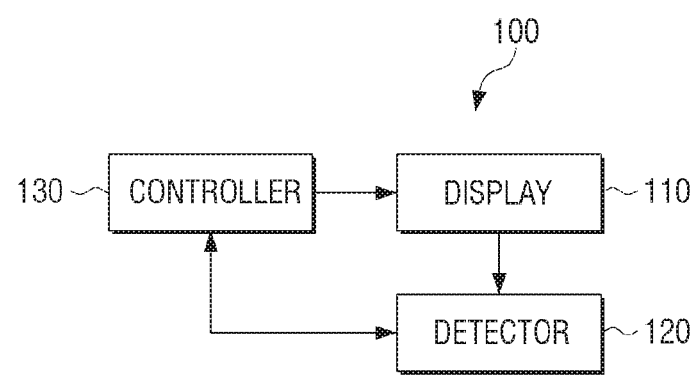
FIG. 2 is a block diagram illustrating configuration of a user terminal device according to an exemplary embodiment.

FIG. 2 is a block diagram provided to explain configuration of a user terminal device according to an exemplary embodiment. According to FIG. 2, the user terminal device 100 includes the display 110, a detector 120, and a controller 130. In FIG. 2, only those elements which are involved in operations according to various exemplary embodiments are illustrated, and other detailed elements are omitted.

The display 110 may display various types of screens such as a home screen, an icon screen, a list screen, an application execution screen, a web browser screen, a content play screen, etc. Various objects such as an icon, an image, and a text may be displayed on each screen. A user may select those objects.

The detector 120 may detect a user manipulation with respect to the display 110. In particular, when a user touches one of the objects displayed on the screen, the detector 120 may detect the touched point and notify the controller 130.

The controller 130 may control overall operations of the user terminal device 100. When it is detected by the detector 120 that one icon is selected, the controller 130 performs a control operation corresponding to the one icon.

The controller 130 may determine a mode according to which inputters is used, among a plurality of inputters capable of manipulating the user terminal device 100, and may change a screen layout according to the determined inputters. The inputters may include a part of a user body such as a finger, other electric conductors, the pen 200, etc. By using such various inputters, a user may control the operations of the user terminal device 100.

In a first mode where a first inputter, among a plurality of inputters is used, the controller 130 arranges and displays objects on the screen of the display 110 according to a first layout. Further, in a second mode where a second inputter is used, the controller 130 rearranges the objects which have been arranged according to the first layout according to a second layout, and displays the rearranged objects.

The first layout and the second layout represent layouts having different properties of displaying a plurality of objects. The display properties may include various properties such as size, form, color, location of display, criteria of arrangement, method of arrangement, the number of objects displayed on each line, etc. The second inputter may be the pen 200, and the first inputter may be various electric conductors such as a user body part or other elements except for a pen. Subsequently, various display properties such as size, form, color, and display location of an object displayed on the screen may vary depending on the type of inputters.

The controller 130 may determine the type of inputters in various ways. For example, the controller 130 may determine an inputters to be used depending on whether the pen 200 is attached to or detached from the main body of the user terminal device 100. In particular, when the pen is mounted on the main body of the user terminal device 100, the controller 130 may determine that it is in the first mode, and when the pen is detached, the controller 130 may determine that it is in the second mode.

The pen may be attached or detached in various ways. For example, if the pen fixing unit 190 is realized in the form of hole as illustrated in FIG. 1, there may be a contacting point or a button inside the hole which may be in contact with the pen 200. When the pen 200 is mounted on the pen fixing unit 190, the pen 200 may be in contact with the contacting point or the button may be pressed. In this case, a signal of a certain size may be input to the controller 130 by an electric circuit connected to the pen fixing unit 190. Further, when the pen 200 is detached from the pen fixing unit 190, it is also detached from the contacting point or the button. Accordingly, the level of the signal applied to the controller 130 from the pen fixing unit 190 may change. Based on such change in the signal, the controller 130 may determine that the pen 200 is detached.

The controller 130 may arrange and display a plurality of objects on the screen according to the first layout while the pen is mounted. Further, when it is determined that the pen 200 is detached, the controller 130 changes the layout of the screen displayed on the display 110 to the second layout. The second layout refers to a form of layout corresponding to a pen use mode. In other words, as the pen 200 is sharper than a finger, it allows more accurate touch than a finger. Therefore, when using the pen 200, it is possible to select a menu of smaller size. In addition, when a coil is mounted inside the pen 200, it is possible to distinguish a hovering and a touch using the pen 200.

When at least one object is selected by the pen 200 while the objects are rearranged according to the second layout, the controller 130 performs a control operation corresponding to the selected object.

As such, the user terminal device 100 may realize different layouts depending on whether a pen is used or a finger is used. The different layouts may also include different contents on the screen. Examples of the first layout and the second layout will be described later with reference to the corresponding drawings.

After the pen 200 is detached from the user terminal device 100, the user terminal device 100 is generally controlled by the pen. Thus, the controller 130 automatically enters into a pen use mode without any separate user manipulation. Further, when a pen is mounted on the user terminal device 100 again, the controller 130 returns to a general mode. Accordingly, the layout of the screen is also changed to the first layout, which is the mode before the pen is detached, and the objects on the screen are rearranged according to the first layout.

Figure 3:
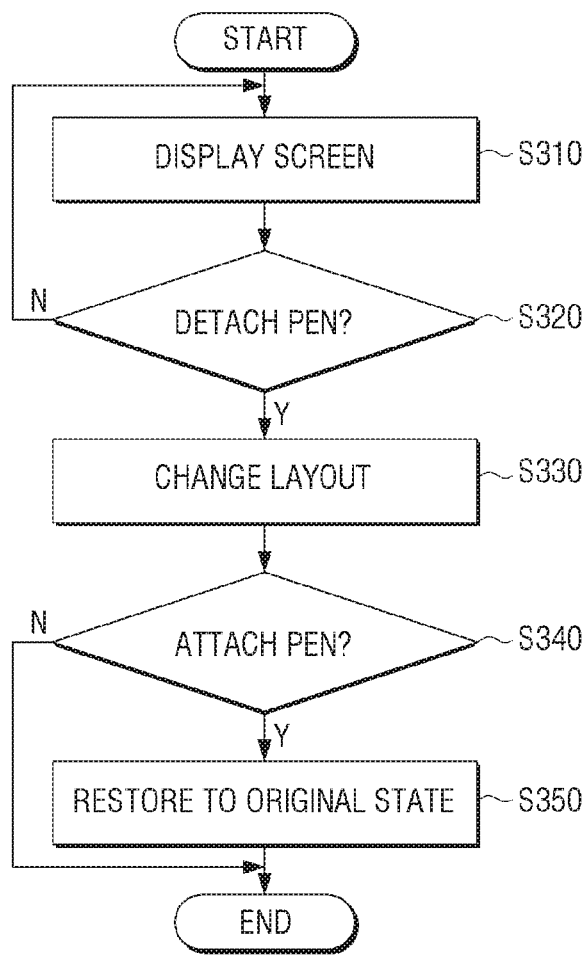
FIG. 3 is a flowchart provided to explain a method for controlling a user terminal device according to an exemplary embodiment.

FIG. 3 is a flowchart provided to explain a method for controlling a user terminal device according to an exemplary embodiment. According to FIG. 3, the display 110 displays a screen including a plurality of objects which are arranged according to the first layout corresponding to a general mode while the pen 200 is mounted on the user terminal device 100 (S310). The screen may be a home screen, or other types of screens such as an icon arrangement screen, an application execution screen, a content play screen, a quick panel screen, etc. At this state, when the pen is detached (S320), the controller 130 changes the layout of screen which is currently displayed (S330).

In other words, the controller 130 changes a screen by rearranging a plurality of objects which are currently displayed on the screen according to the second layout corresponding to the pen use mode. In particular, the controller 130 changes the screen to a shape corresponding to the pen use mode by adjusting at least one of various properties such as size, shape, location, number of objects which are currently displayed on the screen. Therefore, the objects which have been displayed on the screen are rearranged or reconfigured at the same the pen is detached, such that the screen can be in a format which is suitable for using the pen. In this state, if the pen is mounted again (S340), the controller 130 restores the screen to a screen corresponding to the first layout (S350).

The layout may be changed in various shapes and methods according to the type of the screen. In other words, as described above, the display 110 may display various screens such as a home screen, an icon screen, a list screen, an application execution screen, a web browser screen, a content play screen, etc.

The home screen refers to a screen which is displayed for the first time after the user terminal device 100 is turned on and preparation for system is completed. The home screen may also be referred to as a main screen, a basic screen, an initial screen, etc. The home screen may be a basic home screen provided by the manufacturing company of the user terminal device as a default, or may be a user creative screen which is created as the user matches a control operation with an object by directly drawing an icon or other objects. The method for configuring a user creative screen and the method for using the screen will be explained in detail later.

The icon screen refers to a screen where icons regarding the entire applications installed in the display 110 are displayed, and the list screen refers to a screen where information regarding the entire applications is arranged and displayed in the form of list. The application execution screen refers to a screen which is rendered by the execution of application, and the web browser screen refers to a screen where a web page received from an external web server is displayed by the execution of a web browser. The content play screen refers to screen where a multimedia content is reproduced and its video frame is displayed. In addition, the display 110 may display various types of screens.

As described above, the controller 130 operates in various modes depending on whether a pen is attached or detached, thereby performing interaction operations which are appropriate for each mode. For example, a screen according to the first layout may be displayed while a pen is mounted. In this state, if a user selects an object on the screen using his or her finger or other things, the controller 130 may execute a program corresponding to the object and display a corresponding screen.

On the other hand, the controller 130 may display a screen including objects which are rearranged according to the second layout while the pen is detached. In this state, a user may perform various interaction operations using the pen 200 in addition to his or her finger. The controller 130 performs a control operation corresponding to the user interaction operation.

The user terminal device 100 may perform a control operation using not only the pen 200, but also a body part such as the user finger. The user terminal device 100 may distinctively recognize a touch or an approach using the user body part and a touch or an approach using the pen 200. An approach may also be referred to as hovering. Accordingly, different control operations may be performed depending on the type and method of inputters.

The specific configuration of a user terminal device which may distinctively recognize the type and input method of inputters will be described.

Figure 4:
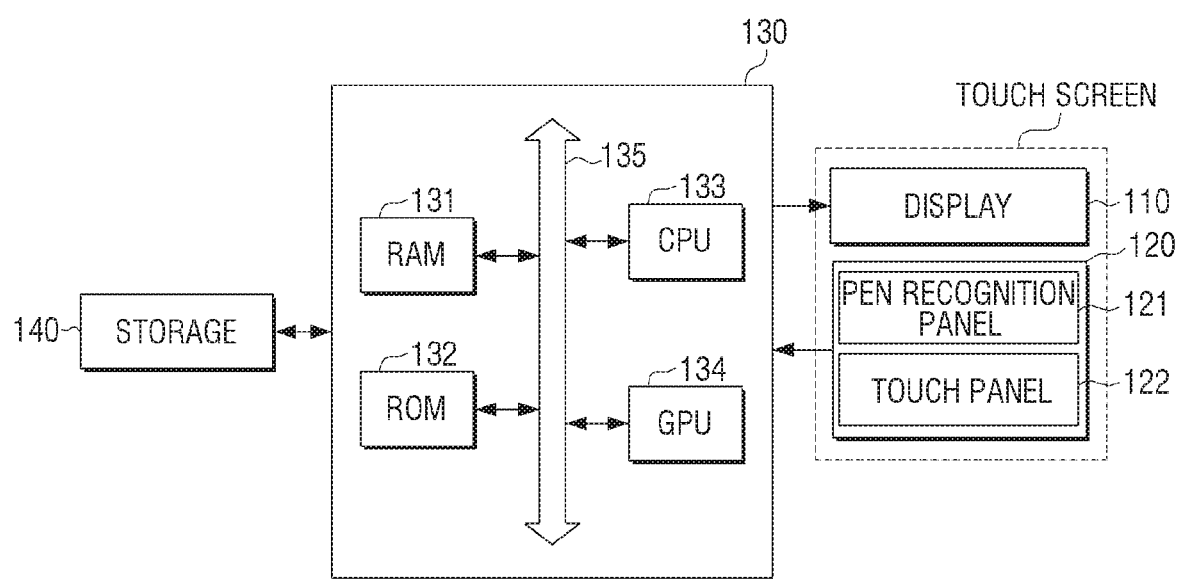
FIG. 4 is a block diagram illustrating configuration of a user terminal device capable of distinguishing a manipulation using a body of a user from a manipulation using a pen.

FIG. 4 is a block diagram illustrating a detailed configuration of a user terminal device capable of distinguishing a pen manipulation. Referring to FIG. 4, the user terminal device 100 includes a display 110, a detector 120, a controller 130, and a storage 140.

The storage 140 is an element to store various programs and data which are necessary to operate the user terminal device 100. The controller 130 controls overall operations of a user terminal device using various programs and data stored in the storage 140.

The controller 130 includes RAM 131, ROM 132, CPU 133, Graphic Processing Unit (GPU) 134, and Bus 135. The RAM 131, the ROM 132, the CPU 133, the GPU 134, etc., may be connected through the bus 135.

The CPU 133 access the storage 140, and performs booting using an operating system (O/S) stored in the storage 140. In addition, the CPU 133 performs various operations using various programs, contents, data, etc., stored in the storage 140.

The ROM 132 stores a set of commands for system booting. If a turn-on command is input and power is supplied, the CPU 133 copies an O/S stored in the storage 140 in the RAM 131 according to the command stored in the ROM 132 and executes the O/S to boot the system. If the booting is completed, the CPU 133 copies various application programs stored in the storage 140 in the RAM 131 and executes various programs copied in the RAM 131 to perform various operations.

When the booting of the user terminal device 100 is completed, the GPU 134 displays a home screen. Specifically, the GPU 134 may generate a home screen including various objects such as an icon, an image, and a text using a computing unit (not shown) and a rendering unit (not shown). The computing unit computes property values such as coordinates, shape, size, and color of each object to be displayed according to the layout of the screen. The rendering unit generates a screen with various layouts including objects based on the property values computed by the computing unit. The screen generated by the rendering unit is provided to the display 110 and displayed within a display area.

In addition, when various applications stored in the storage 140 are executed, the GPU 134 displays execution screens of the corresponding applications using various layout information and menu information included in the applications. In addition, when a command to display an icon screen is input, the GPU 134 displays the icon screen where icons of various applications stored in the storage 140 are arranged. Therefore, the GPU 134 may display various types of screens.

Meanwhile, the GPU 134 may change the layout of each screen according to an operation mode of the CPU 133. For example, if a plurality of objects are arranged according to the first layout in a general mode, the GPU 134 may arrange and display the same objects according to the second layout in a pen use mode. In addition, the screen may be changed in various forms according to whether a mode is the pen use mode or not.

The display 110 displays various screens as described above. The display 110 may be realized as various types of displays such as Liquid Crystal Display (LCD), Organic Light Emitting Diodes (OLED) display, Plasma Display Panel (PDP), etc. The display 110 may further include a driving circuit, a backlight unit, etc., which may be realized in the form of a-si TFT, low temperature poly silicon (LTPS) TFT, organic TFT (OTFT), etc.

In FIG. 4, the display 110 and the detector 120 are realized as a single touch screen.

When a user manipulation is detected through various inputters, the detector 120 notifies the detection result to the controller 130. For example, when a user touches one point of a screen using a finger or a pen, the detector 120 notifies the x and y coordinates of the touched point to the controller 130. When a user moves the touched point while touching the point, the detector 120 notifies the changed coordinates of the touched point to the controller 130. The detector 120 may detect an approach of a user in addition to a direct touch.

In particular, the detector 120 may include a pen recognition panel 121 and a touch panel 122. The pen recognition panel 121 detects an approach input or a touch input of the pen 200, and outputs an event signal according to the detection result. The pen recognition panel 121 may be realized according to an EMR method, and may detect a touch or an approach input according to the change in the intensity of electromagnetic field by an approach or a touch of a pen. In particular, the pen recognition panel 121 may include an electromagnetic induction coil sensor (not shown) and electromagnetic signal processing circuit unit (not shown). The electromagnetic induction coil sensor has a grid structure where a plurality of loop-coils are transposed. The electromagnetic signal processing circuit unit provides AC signals sequentially to each of the loop coils of the electromagnetic induction coil sensor, and transmits signals output from each loop coil to the controller 130.

In the case where the pen 200 is configured to include a resonance circuit, if the pen 200 exists near the loop coil of the pen recognition panel 121, the magnetic field transmitted from the corresponding loop coil generates a electric current in the resonance circuit of the pen 200 based on mutual electromagnetic induction. An induction magnetic field is generated from a coil which constitutes the resonance circuit of the pen based on the electric current, and the pen recognition panel 121 detects the induction magnetic field from a loop coil which is in the signal reception state, thereby detecting an approach location or a touch location of the pen. In the above exemplary embodiment, the pen 200 is recited as a plurality of inputters, but any object capable of generating an electric current based on magnetic induction may be used as an inputters. The pen recognition panel 121 is disposed at the lower portion of the display 110, and may be activated as a specific event occurs or as a default.

The touch panel 122 is an element to detect a physical touch input by a user body part or other objects. For example, the touch panel 122 may be provided in the form of touch film, touch sheet, touch pad, etc. When a touch is detected, the touch panel 122 outputs a touch event value corresponding to the touched point.

As described above, the touch panel 122 may include various types of sensors such as a capacitance-type sensor and resistive-type sensor. For example, when the touch panel 122 is realized as a capacitance-type sensor, the touch panel 122 may be coated on both sides of the glasses with a thin metal conductive material (such as Iridium Tin Oxide (ITO) layer) so that an electric current may flow on the surface of the glasses. Further, the touch panel 122 is coated and configured as a dielectric substance which may store an electric charge. When the surface of the touch panel 122 is touched, a certain amount of electric charge is moved to the touched location by static electricity, and the touch panel 122 detects the touched location by recognizing the change in the amount of electric current as a result of the movement of the electric charge, and traces a touch event.

In FIG. 4, it is described that the pen recognition panel 121 and the touch panel 122 are formed on separate panels from each other, but the two panels may be formed on a single panel. Accordingly, the detector 120 may distinguish a touch manipulation and an approach manipulation by a user finger from a touch manipulation and an approach manipulation by a pen. The controller 130 may perform various control operations according to the detection result.

The pen recognition panel 121 may recognize a manipulation by a pen using at least one pixel unit. Accordingly, even if the controller 130 reduces the size of a menu displayed on the screen in a pen use mode, a user may easily select the corresponding menu. In order to detect a minute manipulation by a pen, the pen recognition panel 121 may be produced to have a size which is greater than a display panel of the display 110. Accordingly, a user manipulation may be detected using at least one pixel unit from the border area of the display panel.

Figure 5:
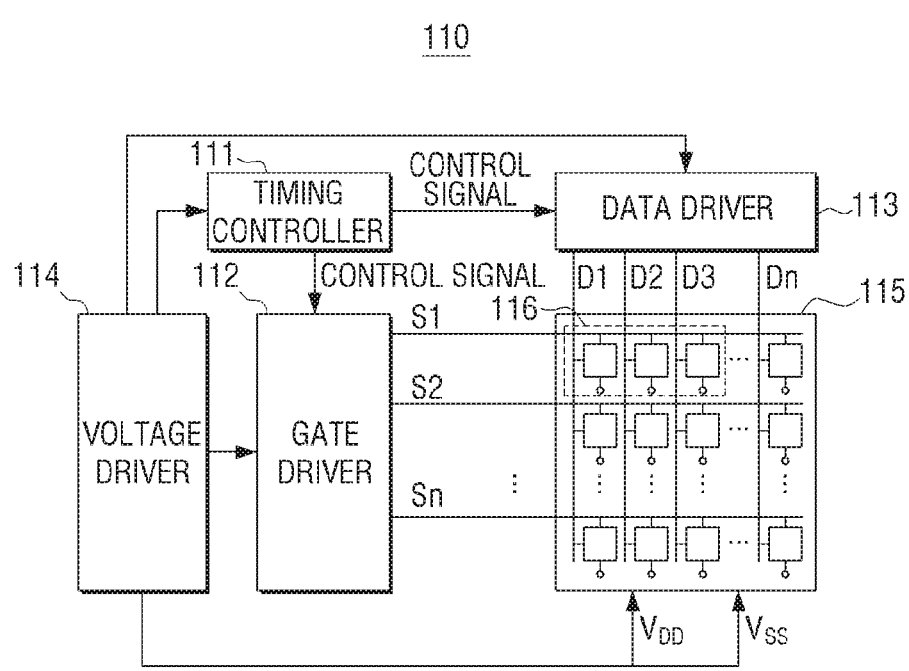
FIG. 5 is a view illustrating an example of configuration of a display.

FIG. 5 is a view illustrating an example of detailed configuration of the display 110. According to FIG. 5, the display 110 may further include a processing circuit unit such as a timing controller 111, a gate driver 112, a data driver 113, and a voltage driver 114, in addition to a display panel 115. Although not illustrated in FIG. 5, the display 110 may further include a frame buffer.

The timing controller 111 receives an external clock signal which is suitable for the display panel 115, a horizontal sync signal (Hsync), a vertical sync signal (Vsync), etc., generates a gate control signal (scanning control signal) and a data control signal (data signal), and outputs the signals to the gate driver 112 and the data driver 113, respectively.

The voltage driver 114 is an element to transmit a driving voltage to the gate driver 112, the data driver 113, the display panel 115, etc. Specifically, VDD or VSS may be provided, which are necessary for the display panel 115. In addition, a gate-on-voltage (Vgh) may be generated and provided to the gate driver 112.

The gate driver 112 is connected to the display panel 115 through scanning lines (S1, S2, S3, . . . , Sn). The gate driver 112 applies gate on/off voltages (Vgh/Vgl) provided by the voltage driver 115 to the display panel 115, according to a gate control signal generated by the timing controller 111.

A data driver 233 is connected to the display panel 115 through data lines (D1, D2, D3, . . . , Dm). The data driver 233 inputs RGB data of an image frame to the display panel 115 according to a data control signal generated by the timing controller 231.

The display panel 115 is configured such that a plurality of gate lines (GL1~GLn) and a plurality of data lines (DL1~DLn) are transposed to form an pixel area 116. If the display panel 115 operates according to an OLED method, each of the pixel area 116 may be configured to form light emitting elements of R, G and B of an OLED. A switching element, i.e., TFT, is formed on each pixel area 116. In addition, detection sensors for detecting a user manipulation using a body part or a pen may be disposed at a lower part of the each pixel area 116. In other words, the detector 120 may be disposed along with the display 110 so as to detect a user manipulation by at least one pixel unit.

As described above, a user may input a control command to the user terminal device 100 only through the operation of approaching an inputters, such as a finger or a pen, without directly touching the screen of the display 110. In this case, the detector 120 may sense an approached touch using a proximity sensor. The approached touch means that if a movement is recognized within a certain valid recognition range of a space while there is no direct touch on the screen, the movement is acknowledged as a touch gesture.

Figure 6:
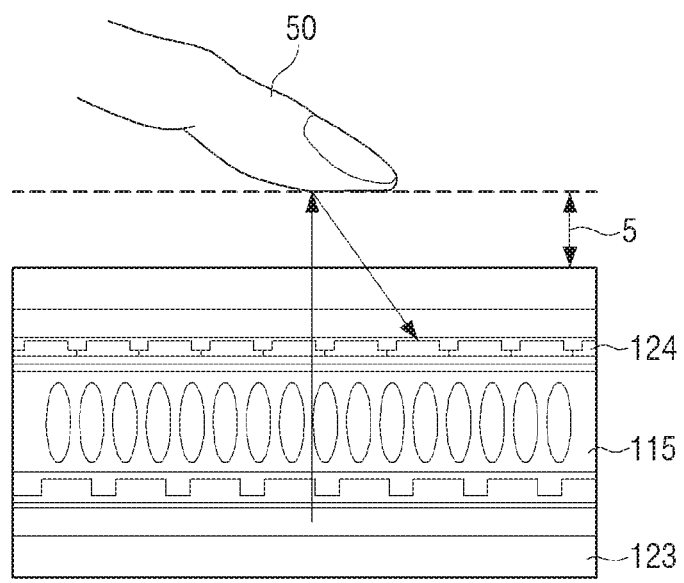
FIGS. 6 and 7 are views provided to explain various methods for detecting a proximal manipulation of a user.

Referring to FIG. 6, the detector 120 may further include an infrared rays source unit 123 and an infrared rays sensor 124. The infrared rays source unit 123 is disposed on one surface of the display panel 115, and the infrared rays sensor 124 is disposed on the other surface of the display panel 115. The infrared rays source unit 123 radiates infrared rays in a surface direction of the display panel 115. Accordingly, a certain area where an approach of a user's finger 50 may be recognized exists on the surface which becomes a valid recognition area 5 where an approached touch can be recognized.

The infrared rays sensor 124 may include a plurality of infrared rays sensing elements which are disposed in an array form. Accordingly, when the finger 50 approaches the valid recognition area 5, the infrared rays sensor 124 may detect infrared rays reflected by the finger 50 and generate an infrared rays scanning image. The user terminal device 100 may detect an input of an approached touch using the generated infrared rays scanning image.

The detector 120 may also detect a case where the pen 200 approaches. In other words, as described above, the pen recognition panel 121 may include an electromagnetic induction coil sensor and an electromagnetic signal processing circuit unit (not shown).

Figure 7:
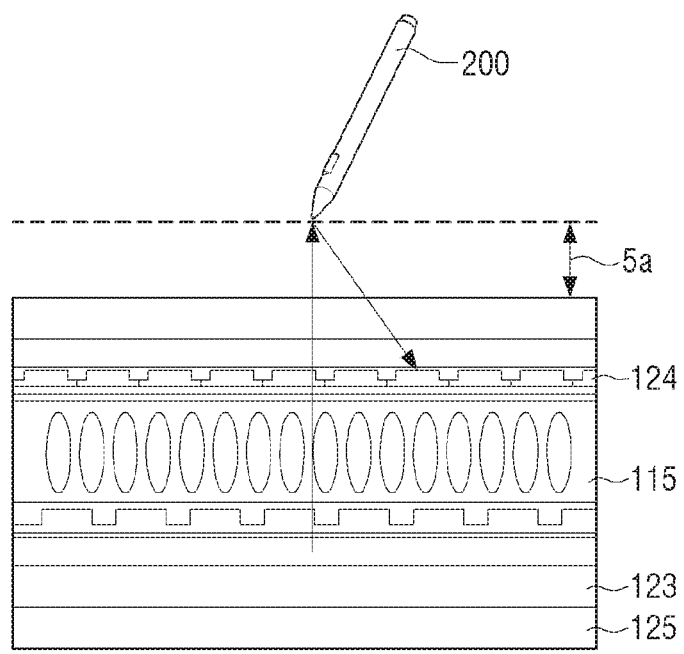

FIG. 7 is a view illustrating an example of a configuration to detect an approach of the pen 200 using the pen recognition panel 121. According to FIG. 7, an electromagnetic induction coil sensor 125 may be further included in the display 110. When the pen 200 approaches, the magnetic field of the approached area changes by the magnetic field coil of the pen 200. Thus, a change in the magnetic field of the electromagnetic induction coil sensor 125 is detected. The detected magnetic field is processed by the electromagnetic signal processing circuit and input to the controller 130. Based on the input value, the point approached by the pen 200 can be detected. In addition, the controller 130 may determine whether there is a direct touch or not according the magnitude of change in the value of the magnetic field.

As illustrated in FIG. 7, when the infrared rays source unit 123, the infrared rays sensor 124, and the pen recognition panel 121 are used, it is possible to recognize whether a touch or an approach is made by a user body part such as the finger 50 or by the pen 200. The controller 130 may perform various control operations selectively according to the type and manipulation method of the inputters. As described above, the screen may be provided in various ways and with various contents. In addition, as a user may manipulate the screen in various ways using various inputters, the layouts may be changed according to the types of the screen. Hereinafter, an example of a screen change when a pen is attached and detached will be explained in detail.

Change of Layout in Home Screen

Figure 8:
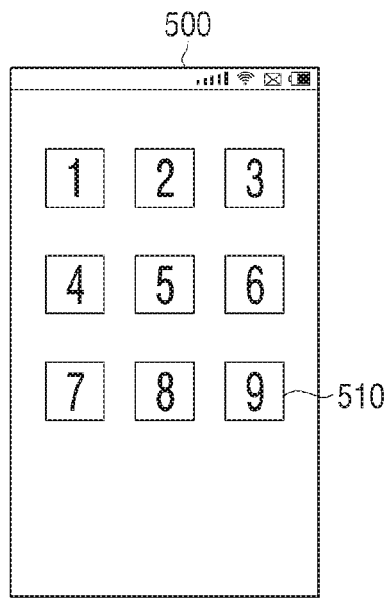
FIGS. 8 and 9 are views illustrating an example of method for changing a screen depending on whether a pen is removed or not.
Figure 8:
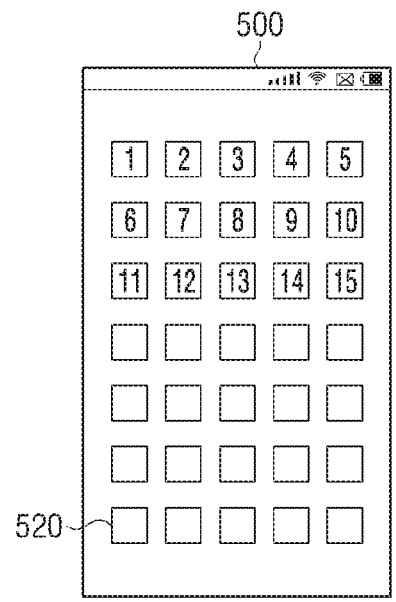

FIG. 8 is a view provided to explain an example of a controlling method when a pen is detached while a home screen is displayed. The home screen consists of a background screen 500 including various objects 510 such as a widget and an icon.

In FIG. 8, it is illustrated that, at the time when a pen is mounted (A), each object 510 has the same size and shape in a matrix form. However, the size and shape of the objects 510 may be realized in various ways. For example, if a widget is included, the widget may be displayed in the size and shape which are different from those of a general icon.

In FIG. 8, the first layout means a 3*3 matrix shape, and the second layout means a 5*7 matrix shape. In other words, the controller 130 arranges and displays a plurality of objects 510 in the 3*3 matrix shape (i.e., the first layout) on the screen 500 while a pen is mounted (A).

In this state, if the pen is detached (B), the controller 130 reduces the size of each object 510 so that the sizes of objects become smaller than those when the pen is mounted. As the sizes of the objects 510 become smaller, more objects 510 can be displayed on one screen 500. Therefore, according to FIG. 8, the controller 130 may arrange the objects 510 in the 5*7 matrix shape on the screen 500 according to the second layout. As described above, when the pen 200 is detached, the layout of the screen may be changed in consideration of the performance of the pen 200 so that a user may use the user terminal device more conveniently.

In FIG. 8, it is illustrated that only the size and the number of objects are changed, but the shape and other display attributes of objects may also be changed. For example, each object may have a square shape in a general mode (i.e., when the pen is mounted) and the shape may be changed in various ways in a pen use mode (i.e., when the pen is detached) in order to induce a pen manipulation. For example, the shape of the objects may be changed to a flag flying in the wind, a dart plate, an arrow target, etc. Alternatively, various animation effect may be applied to each object.

In FIG. 8, the home screen 500 including a plurality of objects 510 is described as an example, but the same exemplary embodiment can be realized in other screens, such as various application screens and icon screens where various objects are arranged and displayed. For example, if a pen is detached while an icon screen where icons of the entire applications installed in the user terminal device 100 are arranged is displayed, the controller 130 may reduce the size of each icon so that the number of icons displayed on the screen may increase. Alternatively, if a gallery program for displaying stored photo contents or video contents is executed, the controller 130 may display a photo gallery screen including a plurality of thumbnail images regarding each of the photo contents and the video contents. If the pen is detached while such a photo gallery screen is displayed, the controller 130 may reduce the size of each thumbnail image while increasing the number of images so as to provide more thumbnail images on the screen. In addition, the exemplary embodiment of FIG. 8 may also be realized in other various screens such as a web browser screen.

Figure 9:
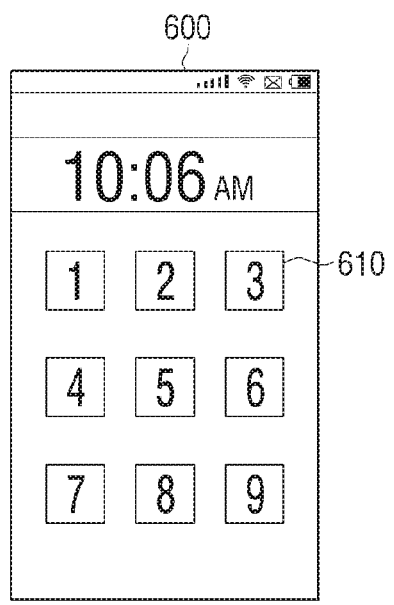
Figure 9:
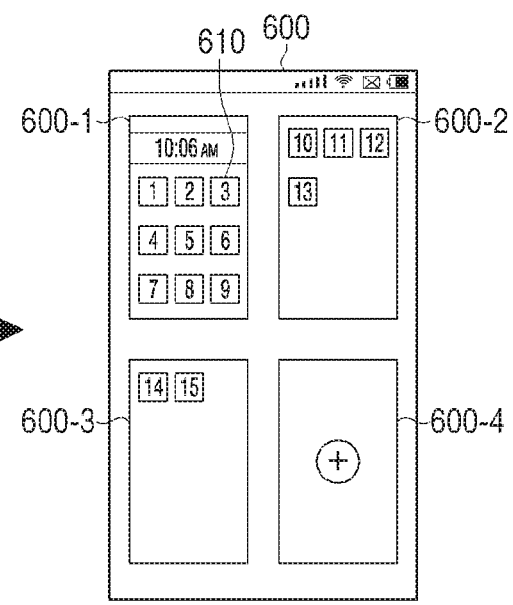

FIG. 9 is a view provided to explain another example of the controlling method when the pen is detached while the home screen is displayed. According to FIG. 9, the display 110 may display a home screen 600 which includes a plurality of objects 610 such as a widget, an icon, etc.

The controller 130 displays each object 610 in a size which can be touched by a finger while the pen 200 is mounted (A). The home screen 600 may be divided by a plurality of pages, and may be converted by a page unit. While the pen 200 is mounted, a user may touch the home screen 600 which is currently displayed and drag or flick the screen in one direction so as to turn pages. When a page is turned, the display 110 displays objects on the turned page.

When the pen is detached (B), the controller 130 may display the entire pages 600-1 through 600-4 on one screen 600. The objects 610 disposed by a user are displayed on each page 600-1 through 600-4. According to an exemplary embodiment, a user may check objects 610 displayed on the entire pages 600-1 through 600-4 only with the operation of detaching the pen 200. In addition, a user may directly select the objects on each page 600-1 through 600-4 using the pen 200. When the object 610 is selected, the controller 130 performs a control operation which is matched with the object 610. For example, if an object which is matched with a web browser is selected, the web browser screen may be displayed.

As described above, the exemplary embodiment of FIG. 9 may also be applied to other types of screens in addition to the home screen.

As described above, when the screen is rearranged according to the second layout in the pen detachment mode, a user may perform various interaction operations by touching or hovering each object on the screen using the pen 200 in addition to a finger. In particular, as the pen 200 is capable of performing a minute touch as described above, it is possible to perform various control operations using the pen rather than a finger. The examples of various control operations which can be performed by a pen while the pen is detached and the layout of the screen is changed will be described in detail.

According to another exemplary embodiment, the controller 130 performs various control operations according to a pen manipulation while the pen is detached and the objects on the screen are rearranged and displayed. For example, when there is a hovering, a first control operation corresponding to the hovering is performed. Further, when there is a touch, a second control operation corresponding to the touch is performed. The first control operation and the second control operation are different types of operations from each other.

Figure 10:
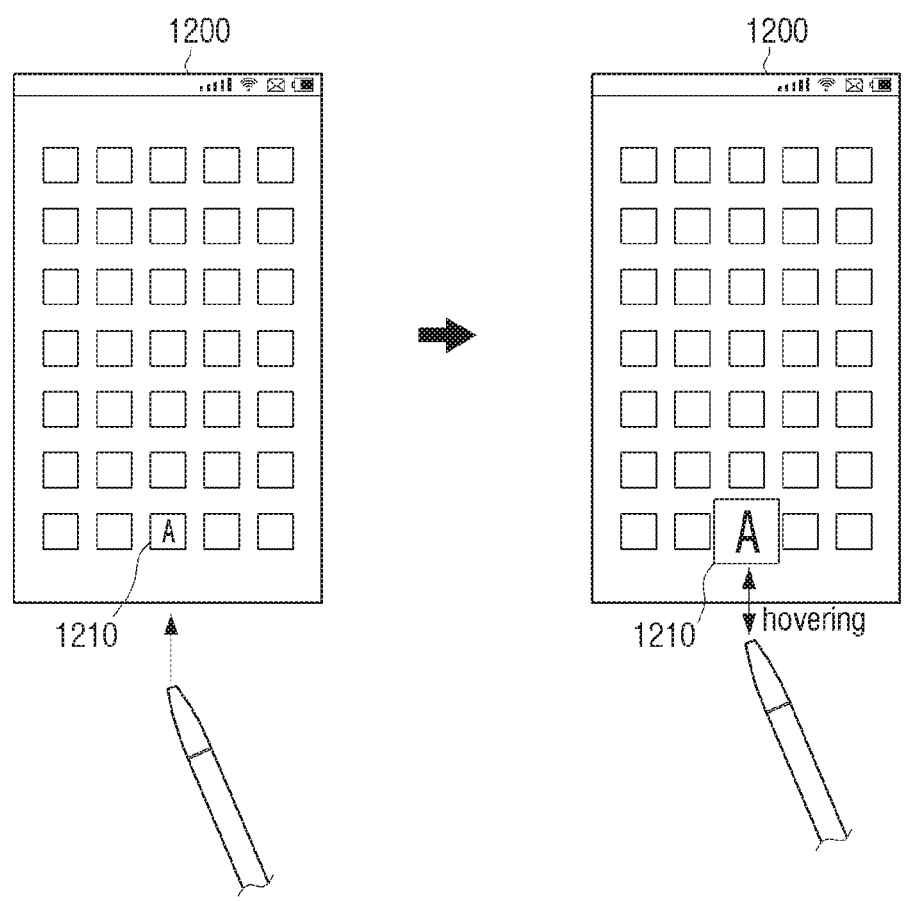
FIGS. 10 to 17 are views provided to explain various interaction methods using a pen.

FIG. 10 is a view illustrating an example of a control operation which is performed using a pen. As described above with reference to FIG. 8, when the pen is detached, the controller 130 may reduce the size of each object 1210 so that more objects can be displayed on one screen 1200. The size of the object 1210 may be reduced to an extent where the object can be identified by human eyes. For example, in the case of an object of which size is 1 cm in length and width in a general mode, the size can be reduced less than 0.5 cm in the pen use mode. However, this is only an example, and the size of an object is not limited thereto.

In this case, when a user performs a hovering manipulation of approaching the pen 200 to one object 1210, the controller 130 may enlarge the size of the object 1210 so that the user may view the content of the corresponding object 1210 more easily. The user may determine whether to touch each object 1210 through a hovering manipulation while viewing the object 1210 more accurately through his or her eyes. If the user touches the corresponding object 1210, the controller 130 performs a control operation matched with the object 1210. In other words, if a hovering is detected in FIG. 10, the controller 130 performs the first control operation of enlarging the object. When a touch is detected, the controller 130 performs the second control operation of executing an application matched with the corresponding object. The size of the object 1210, which is enlarged when a hovering is detected, may be set as a default or may be determined by a user. The size may vary depending the distance of hovering.

Figure 11:
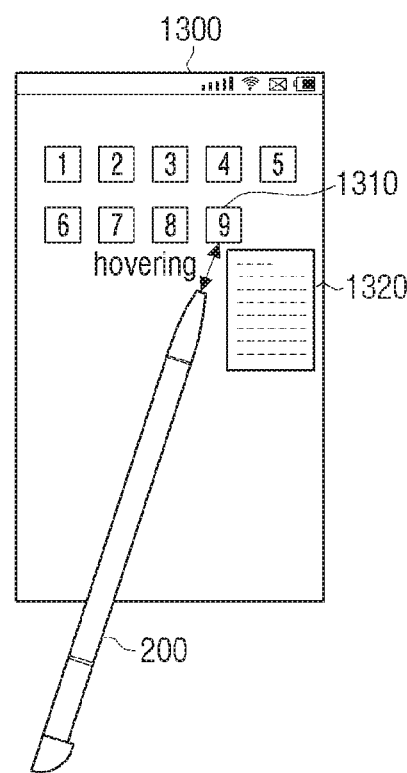

FIG. 11 is a view illustrating another example of a control operation which is performed using a pen. According to FIG. 11, when the pen 200 is hovering on one icon 1310 while a screen 1300 including a plurality of icons 1 through 9 is displayed, the controller 130 displays a pop-up screen 1320 including various information regarding the corresponding icon 1310 on one side. The pop-up screen 1320 may display at least one of a title of the icon, a generation date of the icon, the capacity of an application matched with the icon, a memory occupancy rate, etc. In addition, if a number notification is displayed on one side of the icon 1310, the detailed description regarding the number notification may be displayed when the pen is hovering.

Figure 12:
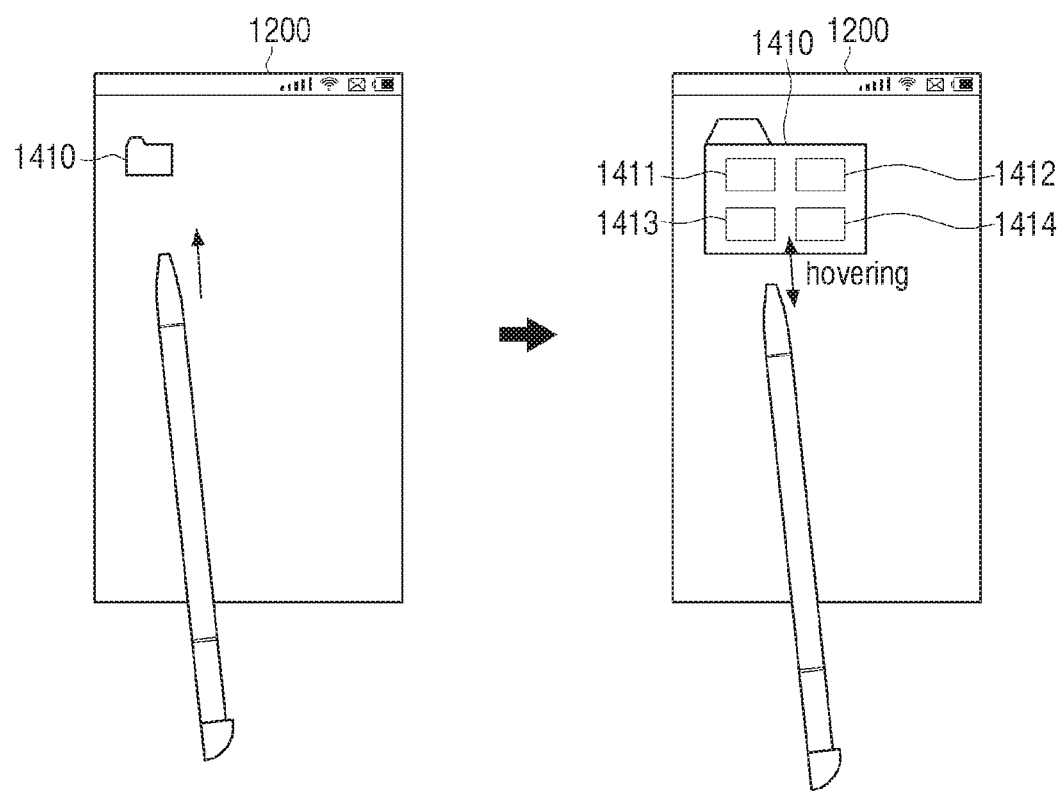

FIG. 12 is a view illustrating another example of a control operation which is performed using a pen. According to FIG. 12, if a hovering of the pen 200 with respect to a folder icon 1410 is detected while a screen 1400 including the folder icon 1410 is displayed, the controller 130 enlarges the folder icon 1410 and displays the entire lists 1411 through 1414 regarding contents of the folder such as icon, photo, etc., on the folder icon 1410. A user may directly select various icons, photos, and other contents displayed on the folder icon 1410 using the pen 200. The controller directly performs a control operation corresponding to the selected object. For example, if a photo is selected, the controller 130 may enlarge the photo and display the photo on the full screen. According to such an exemplary embodiment, a user may check and select the contents of each folder without even opening up each of the folders.

Figure 13:
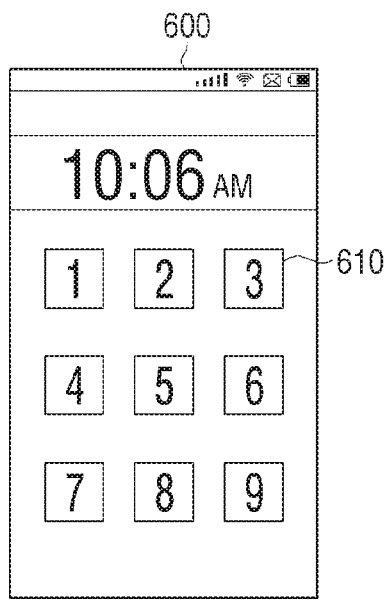
Figure 13:
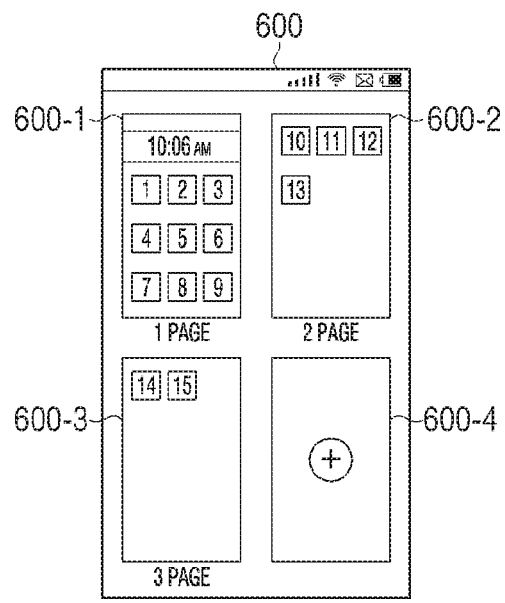
Figure 13:
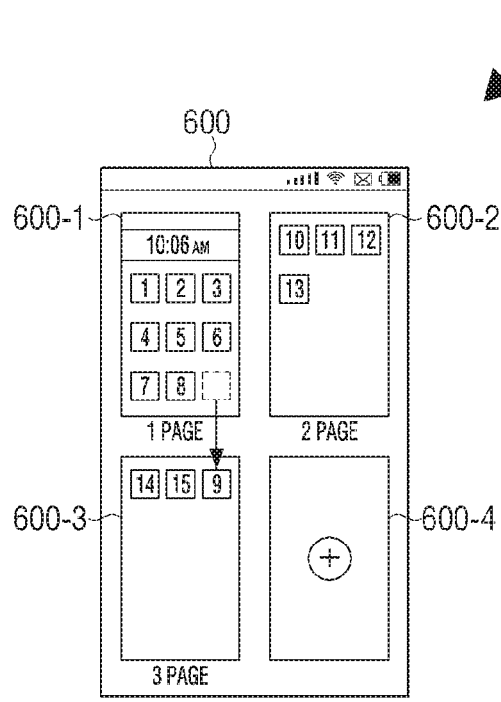

FIG. 13 is a view illustrating another example of a control operation which is performed using a pen. As described above with reference to FIG. 9, if the pen is detached (B) while the screen 600 of one page, among a plurality of pages is displayed (A), the controller 130 may display the entire pages 600-1 through 600-4 on one screen 600.

In this case, a user may move the location of the object 610 between each of the pages 600-1 through 600-4 using the pen 200. FIG. 13 illustrates the process of touching one object (e.g., 9) on the first page 600-1 and dragging it to the third page 600-3. Accordingly, icons can be moved between pages easily.

As described above, the controller 130 may change the layout of the home screen depending on whether the pen is mounted or detached while the home screen is displayed. In some cases, not only the layout of the screen but also the launcher of the home screen may be changed. The operation of displaying different layouts depending on whether the pen is attached or detached may also be applied to other screens than the home screen, such as icon screen, application execution screen, quick panel screen, etc. An example of a change of layout in an application screen as a result of execution of the application will be described in detail.

Change of Layout in Application Screen

Figure 14:
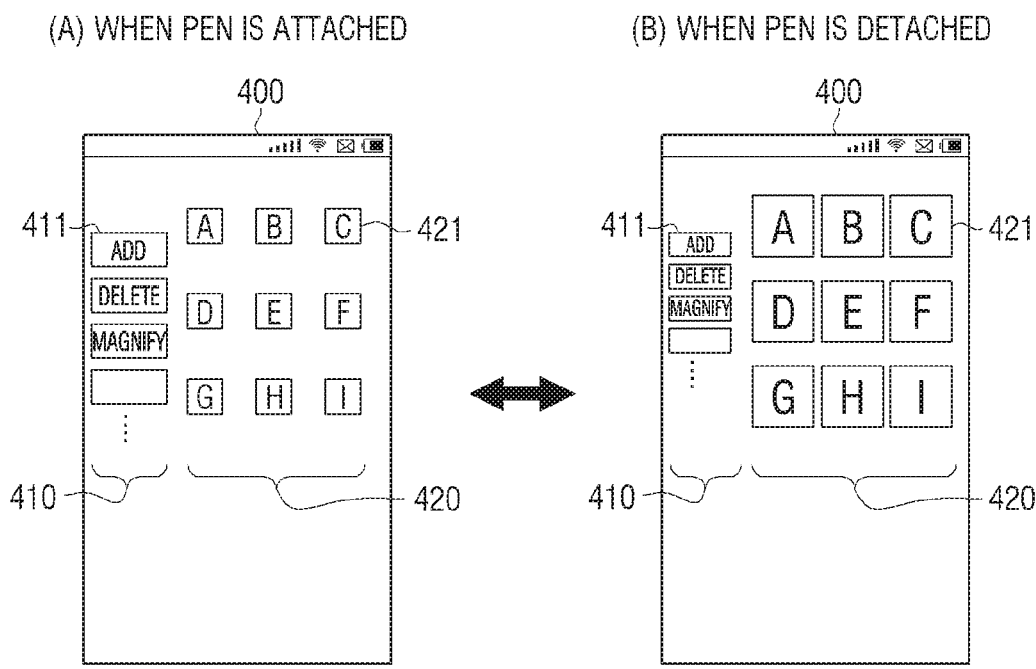

FIG. 14 is a view provided to explain an example of controlling method when a pen is detached. According to FIG. 14, a screen 400 may be divided into a menu area 410 for displaying at least one menu which is selectable by a user and a content display area 420 for displaying at least one content. In particular, when a program (e.g., a gallery program) for viewing multi-media contents such as photos and videos stored in the user terminal device 100 is executed, i.e., a program to reproduce music contents or video contents, various game programs, etc., are executed, the controller 130 may display the screen 400 as illustrated in FIG. 14.

According to FIG. 14, when the pen is mounted (A), the menu area 410 displays each menu 411, which is as large as the size that is sufficiently selectable by a finger. In this state, when the pen is detached (B), the controller 130 reduces the size of the menu area 410, and enlarges the size of the content display area 420. In other words, when the pen 200 is used, each menu 411 may be easily selected even though the size of the menu area 410 is reduced. In addition, as the size of the content display area 420 is enlarged, a user may view a pre-view image of each content 421 more easily. The ratio for adjusting the size of the menu area 410 and the content display area 420 may be set in various ways according to the display size and ratio of the user terminal device 100.

If a program which allows a user to draw using the pen 200 is executed, the controller 130 may display a screen which is divided into a menu area and a canvas area. In this case, when the pen is detached, the screen may be resized such that the menu area is reduced and the canvas area is enlarged just like the above case.

Figure 15:
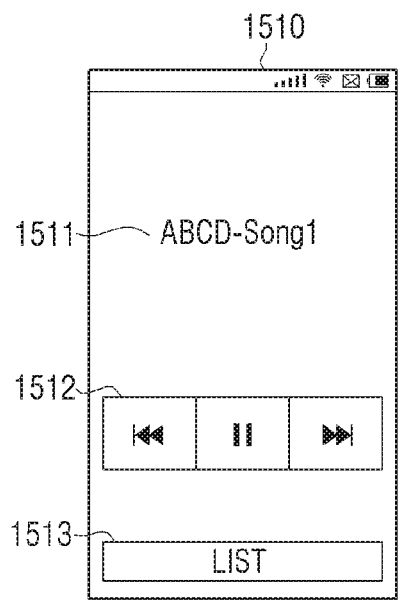
Figure 15:
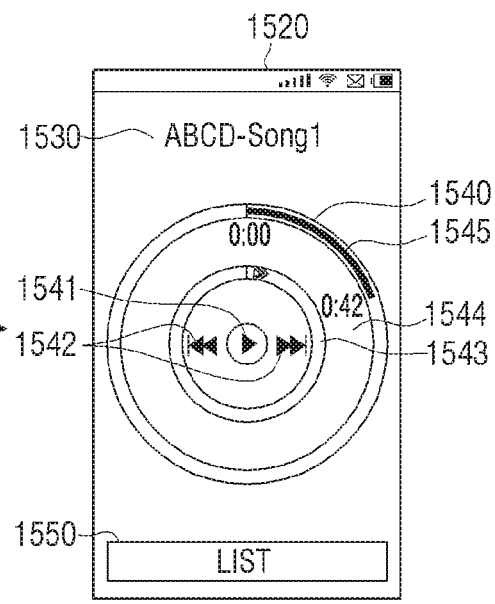

FIG. 15 is a view provided to explain another controlling method for changing a layout of an application screen. According to FIG. 15, when a music content play program is executed, the controller 130 displays the execution screen 1510, 1520. If the program is executed while the pen 200 is mounted (A) or if the pen 200 is mounted after the program is executed, the controller 130 displays the first execution screen 1510 according to the first layout. The first execution screen 1510 may display information on a reproduced content 1511, a control menu 1512 in the size which is touchable by a finger, and a menu 1513 for checking a list of music contents which can be reproduced.

Moreover, if the program is executed while the pen is detached (B) or if the pen is detached after the program is executed, the controller 130 displays the second execution screen 1520 according to the second layout. The second execution screen 1520 may display not only information on reproduced contents and a menu for checking a list of music contents which can be reproduced 1550, but also a circular object 1540.

The circular object 1540 may include various buttons 1541, 1542 which can be selectable by touch, a volume menu 1543, a reproduction state adjustment menu 1544 which are adjustable through touch-and-drag by the pen 200, a reproduction state display area 1545, etc. A user may touch and drag the area where the volume menu 1543 is displayed in a clockwise direction using the pen 200 to increase the volume, or may touch and drag the area in a counterclockwise direction to decrease the volume. In addition, a user may touch and drag the area where the reproduction state adjustment menu 1544 is displayed in a clockwise direction using the pen 200 to put forward a reproduction point and may touch and drag the area in counterclockwise direction to put backward a reproduction point.

As illustrated in FIG. 15, if a circular object is provided, a user may perform various interaction operations with a gesture of drawing a circle on the border of the circular object using the pen 200.

The circular object of FIG. 15 may be displayed in the form of disk. In other words, a user may act like a deejay by grapping and scratching the disk using the pen 200.

In FIG. 15, a circular object is illustrated, but various types of user interfaces (UIs) which can be manipulated easily by the pen 200 may be provided when the pen 200 is detached. Further, according to another exemplary embodiment, a user may touch an indicator area using the pen 200, and control the operation of the user terminal device 100. An interaction operation of touching and controlling an indicator area will be described in detail.

Example of Controlling Indicator Area

Figure 16:
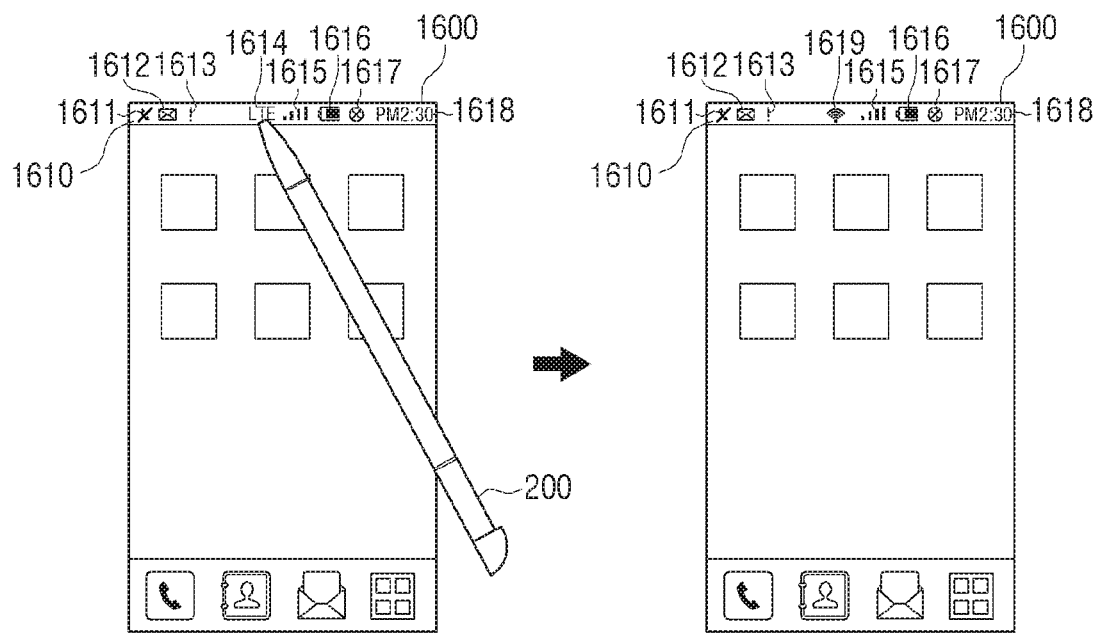
Figure 17:
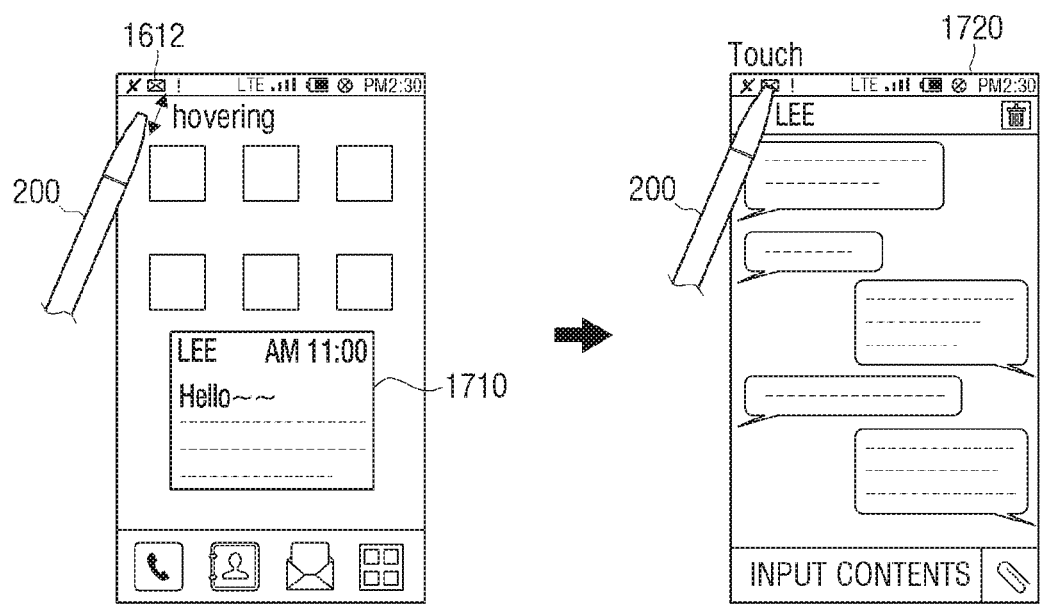

FIGS. 16 and 17 are views provided to explain a control operation according to an example of controlling an indicator area. According to FIG. 16, the controller 130 may display a screen 1600 including an indicator area 1610 where at least one indicator 1611 through 1618 are displayed.

Each indicator 1611 through 1618 is provided to inform an operation state of the user terminal device 100. The indicators 1611 through 1618 may include the indicator 1611 for informing an absent call, the indicator 1612 for informing a newly-received message or messenger, the indicator 1613 for informing a program update, the indicator 1614 for informing a current communication method, the indicator 1615 for informing a communication state, the indicator 1616 for informing a residual battery, the indicator 1617 for informing whether an alarm is set, and the indicator 1618 for informing the time. The size, type and shape of the indicators are only an example, and the indicator area 1610 may be displayed in other shapes. For example, an indicator for informing a date, an indicator for informing a weather condition, an indicator for informing a predetermined schedule, an indicator for informing whether an operation mode of the user terminal device is a power-saving mode or a general mode, an indicator for informing whether a current mode is a vibration mode or a bell-sound mode, an indicator for informing whether a Bluetooth is used, etc., may also be displayed in the indicator area 1610 depending on an exemplary embodiment.

The indicator area 1610 may be displayed all the time even if the type of screen 1600 is changed, and the indicator area 1610 is generally displayed in a smaller size in comparison with other areas. Accordingly, it is not easy to touch the indicator area 1610 with a finger. However, the pen 200 which has a sharp end may directly touch the indicators 1611 through 1618 which are displayed in the indicator area 1610.

The controller 130 operates in a general mode while the pen 200 is mounted on the user terminal device 100, and the controller 130 operates in a pen use mode when the pen 200 is detached from the user terminal device 100. The mode may be changed automatically at the time when whether the pen is detached or not is detected.

When there is a touch to select an indicator in a general mode, the controller 130 disregards the touch manipulation. In other words, each indicator 1611 through 1618 may not receive a user selection in a general mode. Further, when an indicator in the indicator area is touched by the pen 200 in a pen use mode, the controller 130 performs a control operation corresponding to the touched indicator.

For example, when an indicator for informing a current mode set in the current user terminal device 100 is selected by the pen 200 from among indicators, the controller 130 changes the shape of the indicator to a shape corresponding to another mode, and changes the current mode of the user terminal device 100 to another mode.

FIG. 16 illustrates a state where the indicator 1614 for informing that the current communication method of a user terminal device is Long Term Evolution (LTE) is touched by the pen 200. In this case, the controller 130 changes the current communication method to another communication method (e.g., WiFi), and changes the indicator 1614 to the indicator 1619 which corresponds to WiFi. In this state, if the indicator 1619 is selected again, the controller changes the indicator 1619 back to the indicator 1614, and also restores the communication method to the original communication method. In other words, a user may directly control various operations of the user terminal device 100 on the indicator area 1610 using the pen 200.

In addition to the communication mode, a vibration mode and a bell-sound mode may also be toggled and changed in the same manner.

Further, if a user performs a hovering with respect to various indicators, the controller 130 may perform various control operations according to the type of the indicators.

FIG. 17 is a view provided to explain a control operation when there is a hovering with respect to a message indicator. As illustrated in FIG. 17, if there is a newly received message which is not yet checked by a user, the controller 130 displays the message indicator 1612. If the user performs a hovering of approaching the pen 200 to the message indicator 1612, the controller 130 displays a pop-up screen 1710 corresponding to the message indicator 1612. The pop-up screen 1710 may display at least part of the content of the new message.

In this state, if the user touches the corresponding message indicator 1612 with the pen 200, the controller 130 displays a execution screen 1720 of a message program. The user may check the entire message through the execution screen 1720, or may input a reply.

In addition, the controller 130 may perform various control operations according to a user hovering or the type of touched indicator.

For example, if a user performs a hovering above the alarm indicator 1617, the controller may display a pop-up screen including at least part of setting information regarding an alarm, such as information on the next alarm time, information on alarm sound, etc. Alternatively, if a user performs a hovering above the clock indicator 1618, the controller 130 may display a pop-up screen including various information regarding time and date, such as time information, weather information, lunar-calendar date information, etc., of a predetermined country. In addition, if a user performs a hovering above the absent call indicator 1611, the controller 130 may display a pop-up screen including the telephone number of a absent call, and if a user performs a hovering above the notification indicator 1613, the controller 130 may display a pop-up screen including a notification. Further, if a user performs a hovering above the communication quality indicator 1615 and the battery indicator 1616, the controller 130 may provide information regarding a communication state, a residual battery, etc. In addition, although not illustrated in FIGS. 16 and 17, when an indicator such as an earphone is displayed, the controller 130 may display a music control panel in a pop-up screen when there is a hovering above the indicator.

The above exemplary embodiments describe various examples of changing the layout of a screen and using the screen when the pen is detached while the screen is displayed.

According to another exemplary embodiment, when there is a user manipulation, a screen of different layouts may be provided depending on the type of manipulation. In particular, the layout of a quick panel screen which is displayed according to a simple user manipulation in the home screen may be displayed differently according to the type of manipulation. Various control methods using the quick panel screen will be described in detail.

Example of Changing Quick Panel Screen

Figure 18:
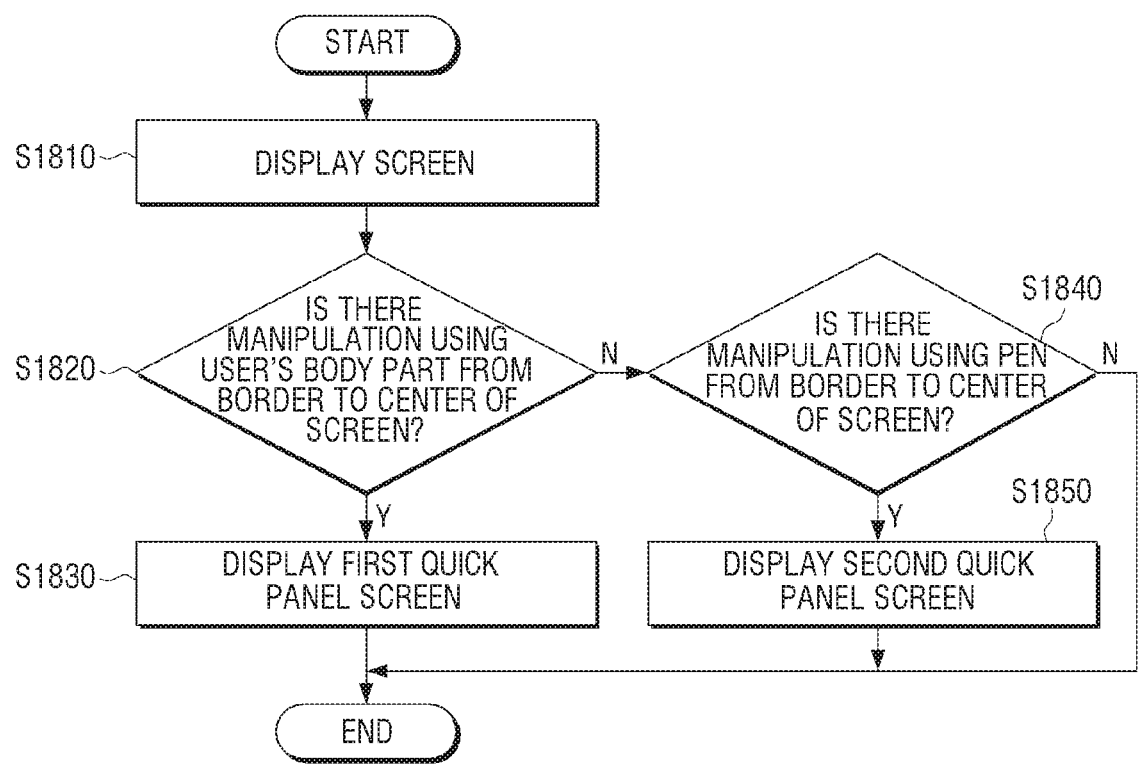
FIG. 18 is a flowchart provided to explain an exemplary embodiment for changing a shape of a quick panel screen according to an operation mode.

FIG. 18 is a flowchart provided to explain a control method according to another exemplary embodiment. According to FIG. 18, a user terminal device may monitor whether there is a general touch manipulation of dragging from the border of the screen towards the center of the screen or there is a pen manipulation (S1820, S1840) while the screen is displayed (S1810).

The general touch manipulation refers to a manipulation with other inputters than the pen 200, such as a body part like a finger, and the pen manipulation refers to a manipulation which uses the pen 200.

If it is determined that a user inputs a dragging from the border of the screen towards the center of the screen using his or her finger (S1820), the controller 130 displays a first quick panel screen (S1830). The quick panel screen refers to a screen which is provided to allow a user to set an operation mode or main functions of the user terminal device quickly. The quick panel screen may also be referred to as a control screen, a setting screen, a mode setting screen, a notification screen, etc.

If it is determined that a user performs dragging using a pen (S1840), the controller 130 displays a second quick panel screen which has a different layout from the first quick panel screen (S1850).

In other words, if there is a dragging using a pen, it is highly likely that there is a pen manipulation later. Thus, the controller 130 may display the second quick panel screen which allows minute control operations using the pen 200.

Figure 19:
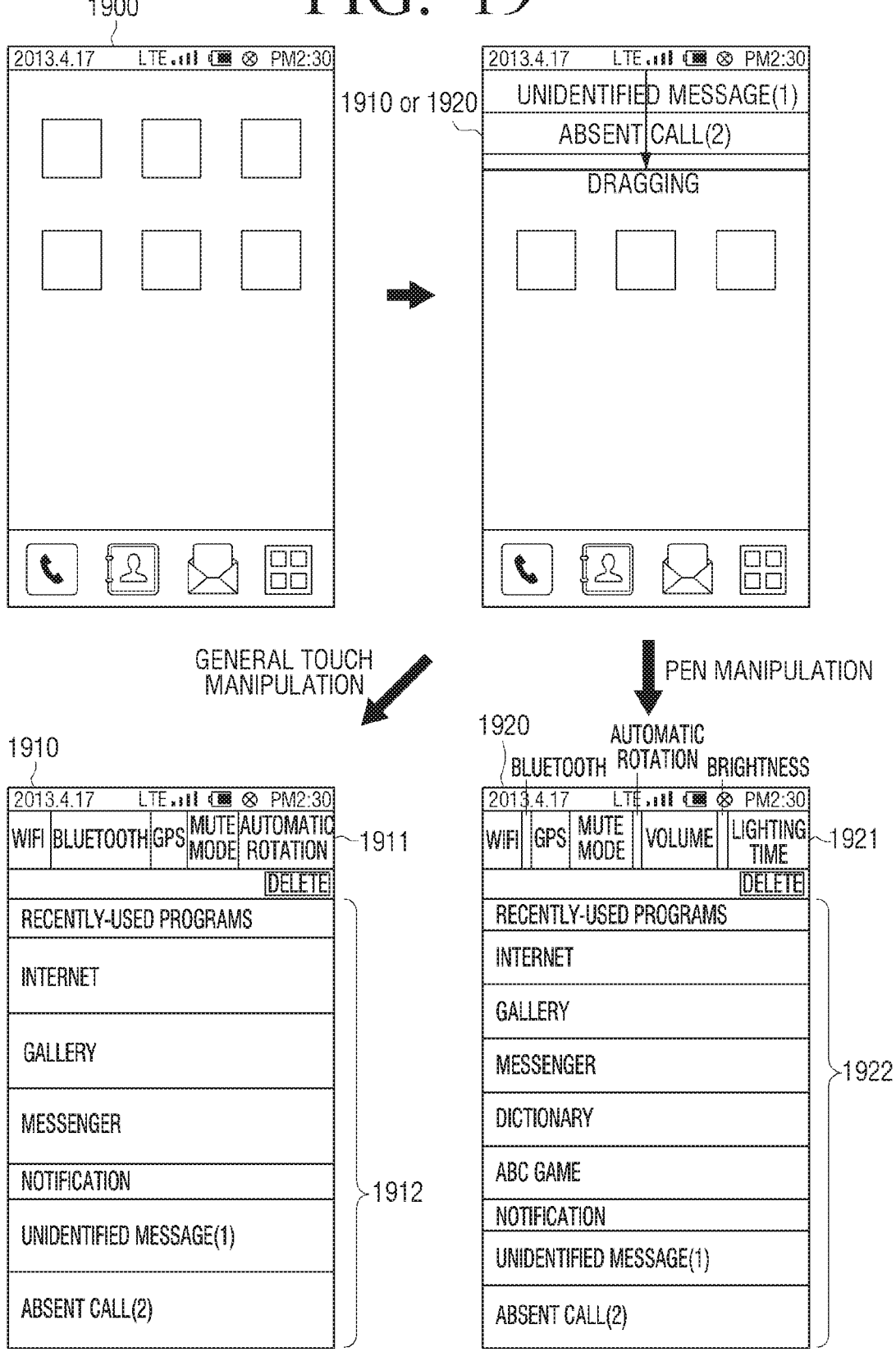
FIG. 19 is a view provided to explain the exemplary embodiment of FIG. 18.

FIG. 19 is a view provided to explain a control operation according to the exemplary embodiment of FIG. 18. According to FIG. 19, when there is a dragging from the border of the indicator area towards the center of the screen, i.e., in the lower direction while an arbitrary screen 1900 is displayed, a hidden screen is scrolled and comes down according to the dragging point.

The controller 130 determines whether the input of dragging is a pen or a user body part based on the detection result by the detector 120.

Accordingly, if it is determined that the dragging is a general touch manipulation using a user body part, the controller 130 displays the first quick panel screen 1910. The first quick panel screen 1910 may display a plurality of tap areas 1911 and various notification items 1912. In FIG. 19, the notification items 1912 are illustrated in the form of bar, but it is only an example.

If it is determined that the dragging is a pen manipulation using the pen 200, the controller 130 displays the second quick panel screen 1920. The second quick panel screen 1920 may also display a plurality of tap areas 1921 and various notification items 1922.

Comparing the first quick panel screen 1910 with the second quick panel screen 1920, it can be seen that the size of the taps 1921 and the notification items 1922 displayed on the second quick panel screen 1920 is smaller than that of the first quick panel screen 1910. Accordingly, the second quick panel screen 1920 may display more taps 1921 and notification items 1922 than the first quick panel screen 1910.

FIG. 19 illustrates that the taps 1921 and the notification items 1922 of the second quick panel screen 1920 are the same as those of the first quick panel screen 1910, i.e., the taps 1911 and the notification items 1912, and include other taps and notification items additionally, but this is only an example. In other words, the taps 1921 and the notification items 1922 of the second quick panel screen 1920 may be different from those of the first quick panel screen 1910, i.e., the taps 1911 and the notification items 1912. In addition, the layout of the quick panel screen may be changed. For example, the first quick panel screen may display the notification items 1912 in the form of bar, and the second quick panel screen may display each notification item 1922 in the form of checkerboard. A user may control the operations of the user terminal device 100 by inputting more minute touch and hovering using the pen 200 on the second quick panel screen 1920. Hereinafter, examples of various control operations using the pen 200 will be described.

Figure 20:
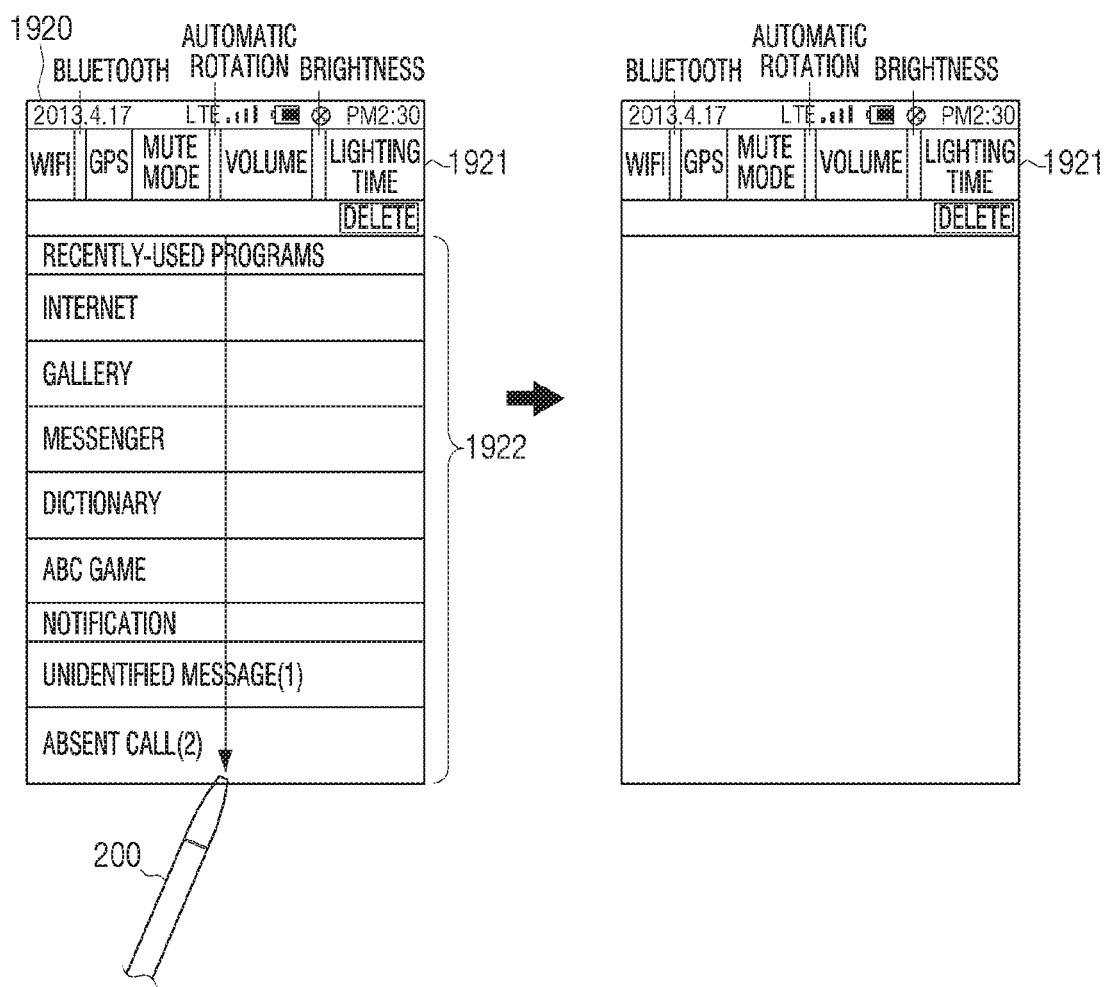
FIGS. 20 to 25 are flowcharts provided to explain various examples of a pen interaction operation on a quick panel screen.

According to FIG. 20, a user may draw a predetermined pattern on the notification item 1922 using the pen 200 while the second quick panel screen is displayed. FIG. 20 illustrates that a user draws a pattern of stroking downward straight. In this case, the controller 130 may delete the entire notification items 1922 displayed on the second quick panel screen 1920 all together. FIG. 20 illustrates the pattern of drawing downward, but the type of patterns may be set in various ways. For instance, the controller 130 may perform the above-described deleting operation when a user draws the patterns of X or O. Accordingly, the user may delete a notification item directly without searching for the menu to delete the notification item.

FIG. 20 illustrates the operation of deleting the entire notification items all together, but a user may delete only a part of the notification items by drawing a predetermined pattern such as pattern X on at least one notification.

Figure 21:
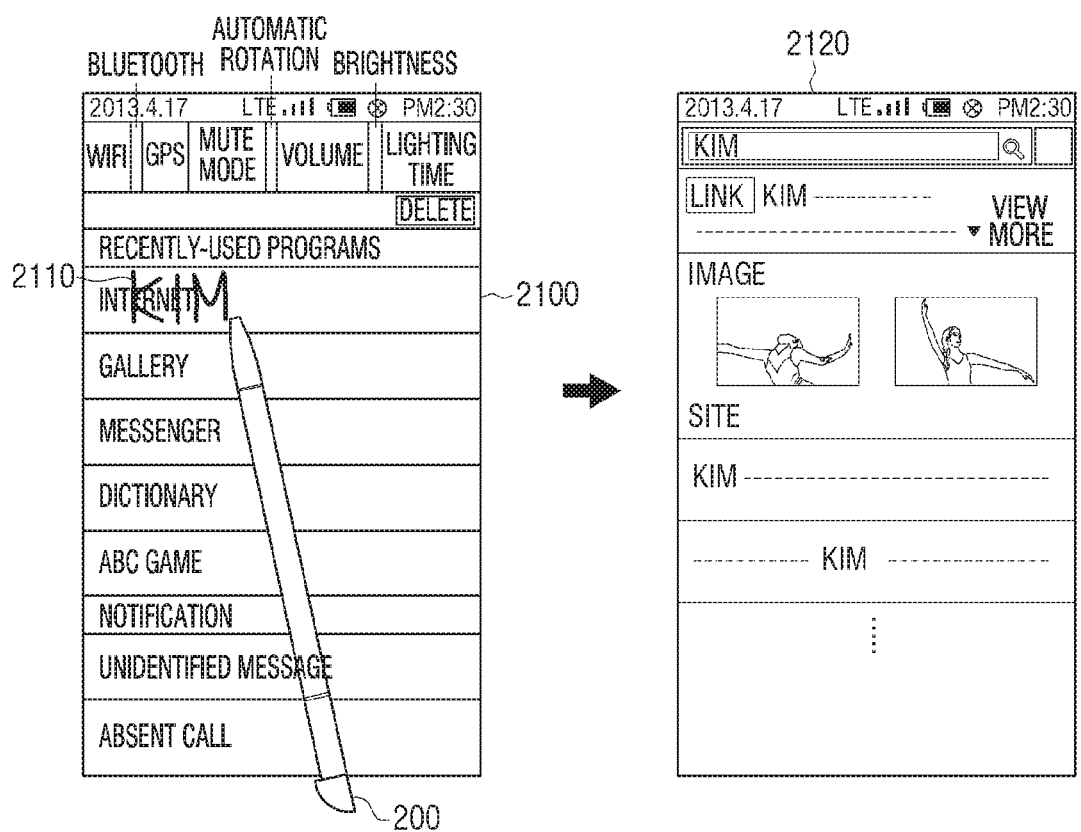

FIG. 21 is a view provided to explain another control operation using a pen. According to FIG. 21, a user may take notes on a notification item using the pen while the second quick panel screen 1920 is displayed. When there is a note-taking by a pen manipulation on one notification item 2100, the controller 130 may perform a control operation corresponding to the type of the notification item 2100 and the contents of the note-taking automatically.

FIG. 21 illustrates a case where the text, "KIM", is written on a notification item 2100 which is related to Internet. The controller 130 executes a web browser matched with the notification item 2100 and access a predetermined web site. Subsequently, the controller 130 searches for a keyword including "KIM" from the corresponding web site, and displays the search result directly on a screen 2120.

Figure 22:
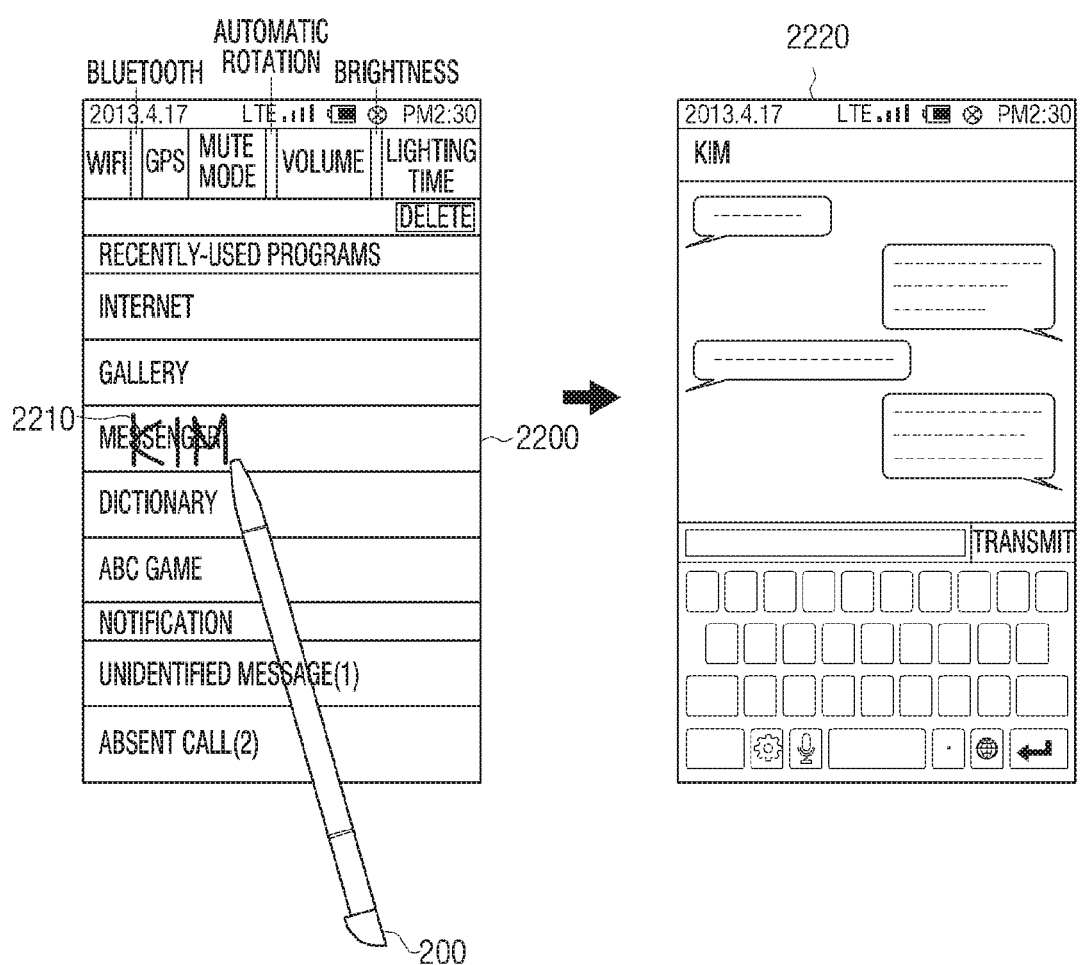

FIG. 22 illustrates a state where the text, "KIM", is written on a notification item 2200 which is related to a messenger program. In this case, the controller 130 executes the messenger program automatically, and displays a messenger screen 2220 including messages exchanged with the person called "KIM".

In addition, if a user draws a specific pattern on a notification item (not shown) for informing reception of a mail, the controller 130 may delete, store securely, or register as favorites the item according to the type of the pattern.

Figure 23:
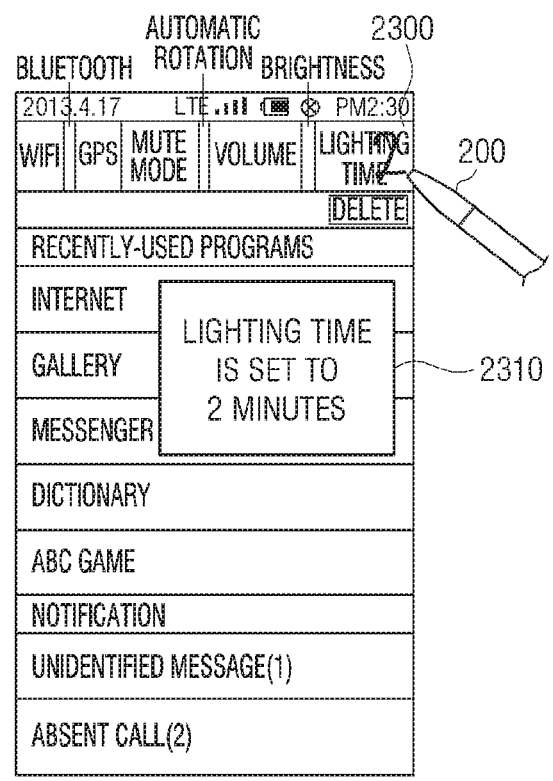
Figure 24:
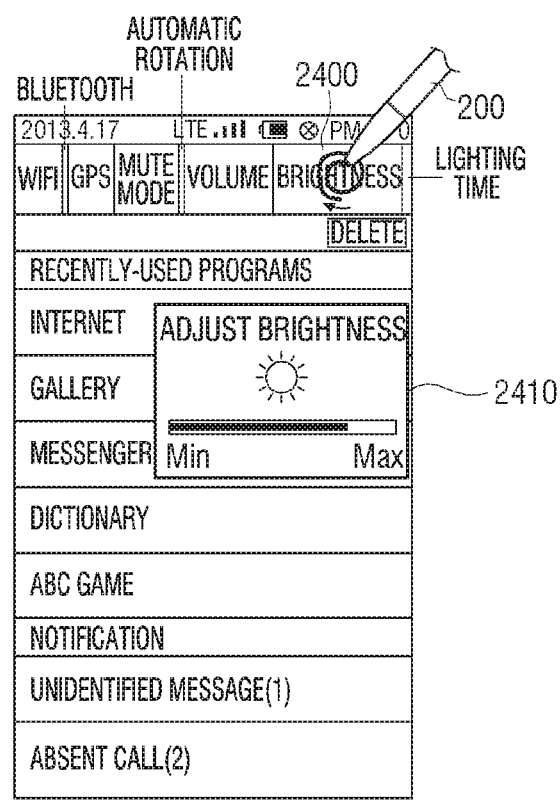
Figure 25:
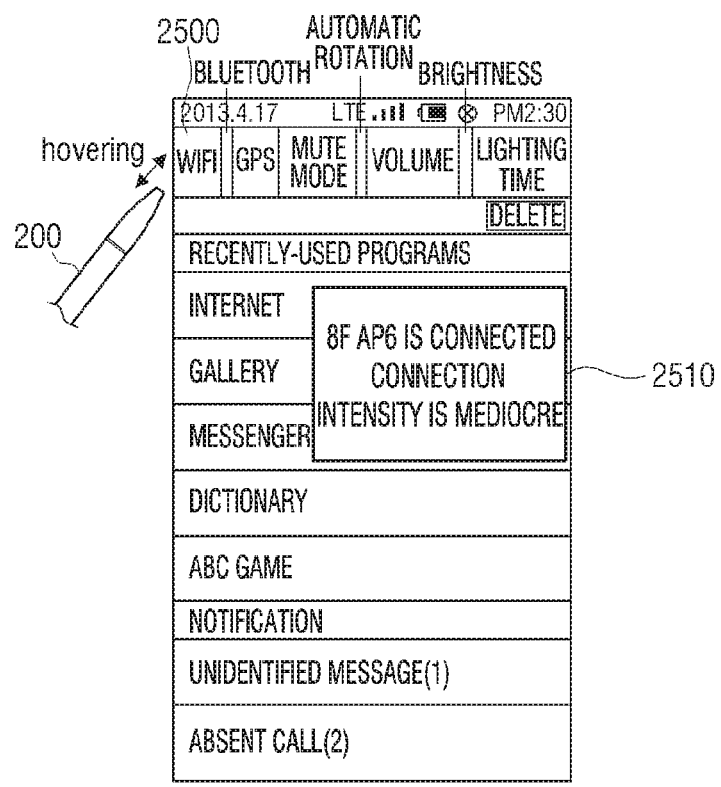

FIGS. 23 to 25 are views illustrating a control method using a tap area on the second quick panel screen.

According to FIG. 23, a user may write an arbitrary number on a tap 2300 of lighting time using the pen 200. The controller 130 recognizes the number and changes a setting parameter of the corresponding tap 2300 to a value corresponding to the recognized number. As illustrated in FIG. 23, if a user inputs the number "2" on the lighting time tap 2300, the controller 130 sets the time for providing light which brightens the screen of the user terminal device 100 to 2 minutes. Subsequently, the controller 130 displays a pop-up screen 2310 for informing the user that the lighting time is set to 2 minutes. The pop-up screen 2310 may be realized as an on screen display (OSD) which is overlapped with the previous screen, i.e., the second quick panel screen.

According to FIG. 24, a user may draw a specific pattern using the pen 200. FIG. 24 illustrates a drawing of a spiral pattern in a clockwise direction on a brightness tap 2400. In this case, the controller 130 may increase the brightness of a screen by increasing the setting parameter value of the brightness tap 2400. Further, if a user draws a spiral pattern in a counterclockwise direction, the controller 130 may reduce the setting parameter value of the brightness tap 2400. The controller 130 may display a pop-up screen 2410 which displays brightness adjustment. In FIG. 24, the spiral pattern is illustrated as an example, but various types of patterns may be used. For example, drawing of a straight line may also change the setting parameter value according to its direction.

Further, a user may perform a hovering with respect to a tap area or a notification item on the second quick panel screen in order to check information regarding the tap or the notification item.

FIG. 25 is a view provided to explain a control operation when there is a hovering with respect to a tap area. According to FIG. 25, when a user performs a hovering over a WiFi tap 2500, the controller 130 may display a pop-up screen 2510 including information regarding a currently-connected WiFi Access Point (AP) or information regarding WiFi intensity.

As described above, a user may use the operations of the user terminal device in various ways using the pen 200. The controller 130 may recognize a user manipulation of the pen 200 using the above-described pen recognition module, and perform a control operation intended by the user by executing various programs accordingly.

In particular, the controller 130 may provide different layouts depending on whether a pen is attached or detached. The controller 130 may change the layout by selectively executing a program or data which has two versions, or by adjusting the resolution of the execution screen of a single program. Accordingly, different usage environments are provided depending on whether it is a touch mode or a pen use mode.

As described above, a user may draw an object directly on the home screen using the pen 200 so as to design his or her own home screen according to personal preference. As the pen 200 allows a fine touch, a user may directly draw a small object on the home screen and match the object with a control operation. Accordingly, it is possible to display a screen which is optimized for the pen use mode.

Figure 26:
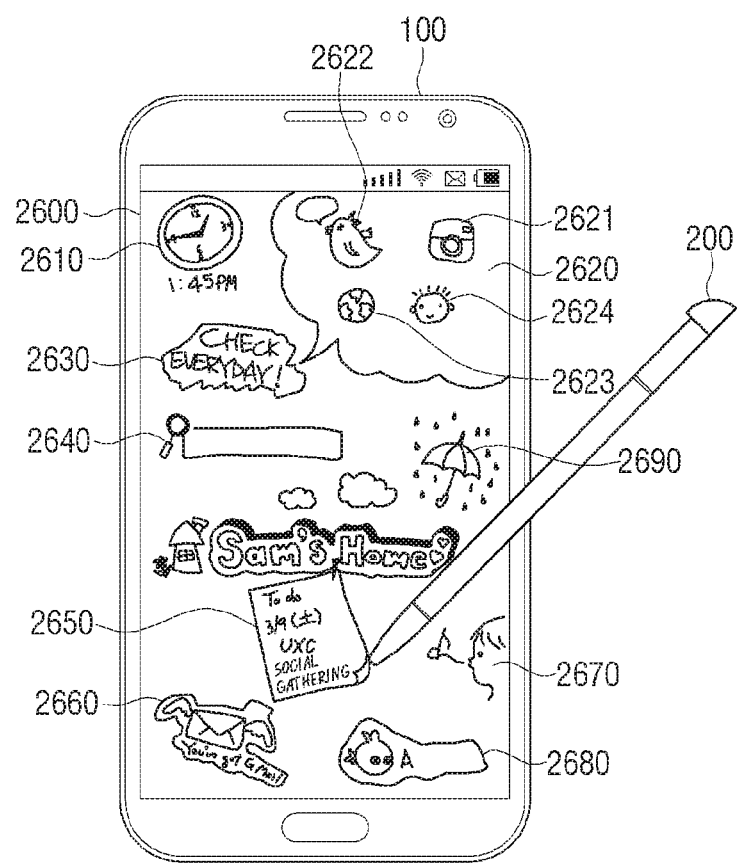
FIG. 26 is a view illustrating an example of a home screen which can be set directly by a user.

FIG. 26 is a view illustrating an example of a home screen which is designed directly by a user. According to FIG. 26, a home screen 2600 of the user terminal device 100 displays various objects 2610 through 2690. Each of the objects 2610 through 2690 is generated in response to a user directly drawing on the home screen 2600 using an inputters such as his or her finger or the pen 200. Accordingly, the display attributes of each object 2610 through 2690, such as size, shape, location, color, etc., are not fixed, but they may be displayed in various ways depending on each user. Each object may be described as an individual object, or may be described to include a plurality of objects 2621 through 2624, similar to the object 2620.

A user may match an object which he or she draws with a desired control operation. If a user matches a control operation with each object, the controller 130 stores the matching information in the storage 140 or in other storage device.

Subsequently, when the displayed object is selected, the controller 130 performs the control operation matched with the object based on the matching information. If the object 2620 including a plurality of objects 2621 through 2624 is selected, the controller 130 may perform a plurality of control operations matched with each object 2621 through 2624.

It is not necessary to match a control operation to all of the objects. Some of the objects may be used only as drawings for visual satisfaction. In FIG. 26, every object is drawn directly by a user, but some of the objects may be provided by the user terminal device 100 as a default.

Further, a user may select a control operation before drawing an object. In this case, the controller 130 may provide an icon corresponding to the selected control operation in advance, similar to a water mark. The user may draw an object following the water mark. Alternatively, the controller 130 may display various images in relation with a selected control operation in advance so that the user may use one of the images as a reference.

Figure 27:
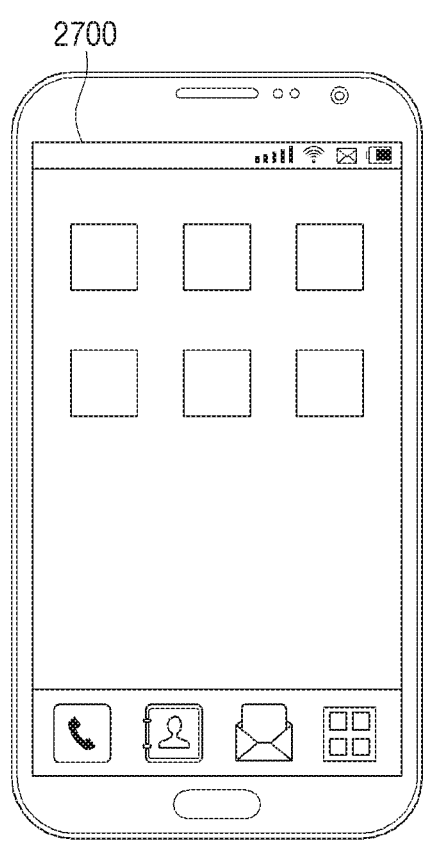
FIG. 27 is a view provided to explain a method for providing different home screens depending on whether a pen is mounted or not.
Figure 27:
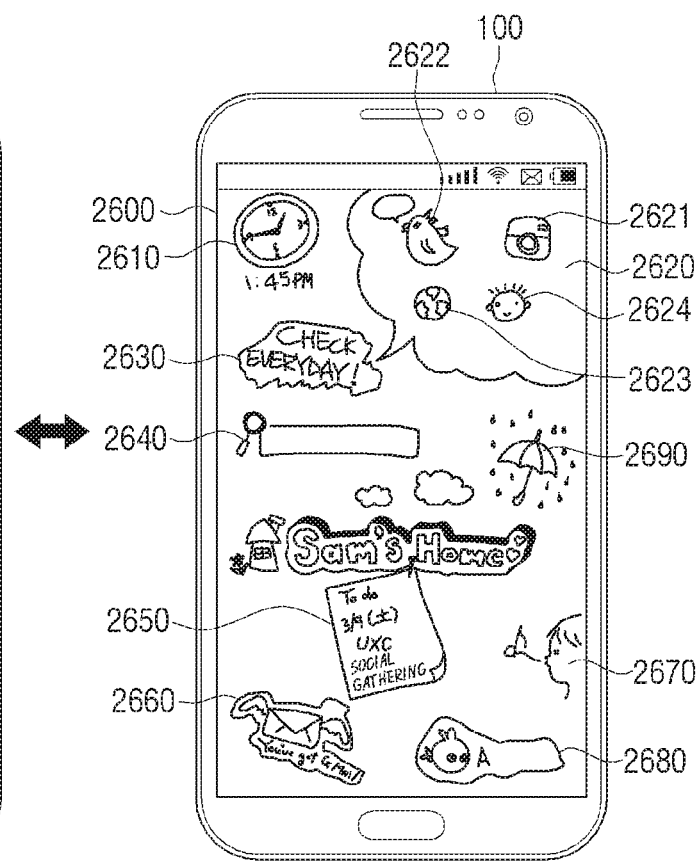

FIG. 27 is a view illustrating that different home screens are provided depending on whether a pen is attached or detached. If the pen is mounted (A), the controller 130 may display a default screen 2700 which is provided by a manufacturer of the user terminal device 100 as a default. In this state, if the pen is detached (B), the controller 130 may display the user creative screen 2600 which is designed directly by a user. The storage 140 may store home screen data to produce the default screen 2700 or home screen data to produce the user creative screen 2600. The controller 130 may use such home screen data to differentiate not only the layout of screen but also the screen itself depending on whether the pen is attached or detached.

When the user creative screen 2600 is displayed after the pen is detached, a user may redesign the user creative screen 2600 by adding or modifying various objects using the pen 200.

In addition, it is possible to change the shape of only a specific widget depending on whether the pen is attached or detached. Hereinafter, the examples of changing the shape of widget will be described in detail.

Change of Widget Depending on Whether Pen is Detached

Figure 28:
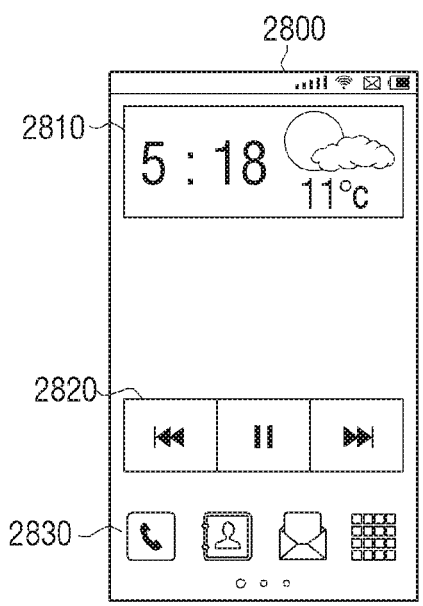
FIGS. 28 to 30 are views provided to explain various pen interaction operations on a widget.
Figure 28:
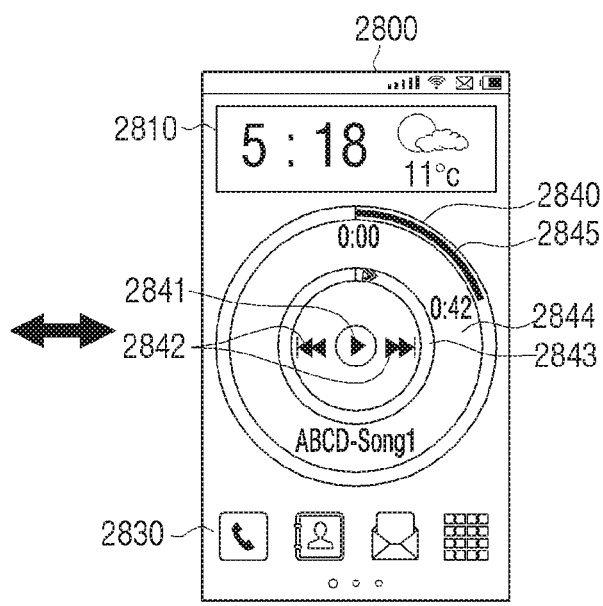

FIG. 28 is a view provided to explain a control method of a user terminal device according to another exemplary embodiment. According to FIG. 28, the user terminal device 100 displays a screen 2800 including various widgets 2810, 2820 and an icon 2830. FIG. 28 illustrates the screen 2800 including the first widget 2810 for displaying weather, time, date, etc., the second widget 2820 for adjusting a content reproduction state, etc. The first widget 2810 is displayed all the time regardless of whether the pen is mounted (A) or detached (B). The shape of the second widget 2820 changes depending on whether the pen is detached or not.

In other words, when the pen is mounted (A), the controller 130 displays each button of the second widget 2820 in the size and shape which can be easily touched by a user finger. In this state, if the user detaches the pen 200 from the user terminal device 100, the controller 130 changes the mode to a pen use mode. Accordingly, the second widget 2820 is changed to a circular object 2840.

According to FIG. 28, the circular object 2840 may include various buttons 2841, 2842 which are selectable by a touch, a volume menu 2843 or a reproduction state adjustment menu 2844 which may be adjustable by a touch-and-drag of the pen 200, a reproduction state display area 2845, etc. As described above with reference to FIG. 15, a user may adjust volume by touching and dragging an area where the volume menu 2843 is displayed using the pen 200, or adjust a reproduction time by touching and dragging an area where the reproduction state adjustment menu 2844 is displayed using the pen 200. The configuration and operation of the circular object 2840 of FIG. 28 have already described above with reference to FIG. 15, so further description will not be provided.

FIG. 28 illustrates that only the shape of one widget 2840 is changed, but the display location, size, number, etc., of the widget may also be changed. In addition, the shape, size, location, etc., of another widget 2810 or the icon 2830 may also be changed depending on circumstances.

Figure 29:
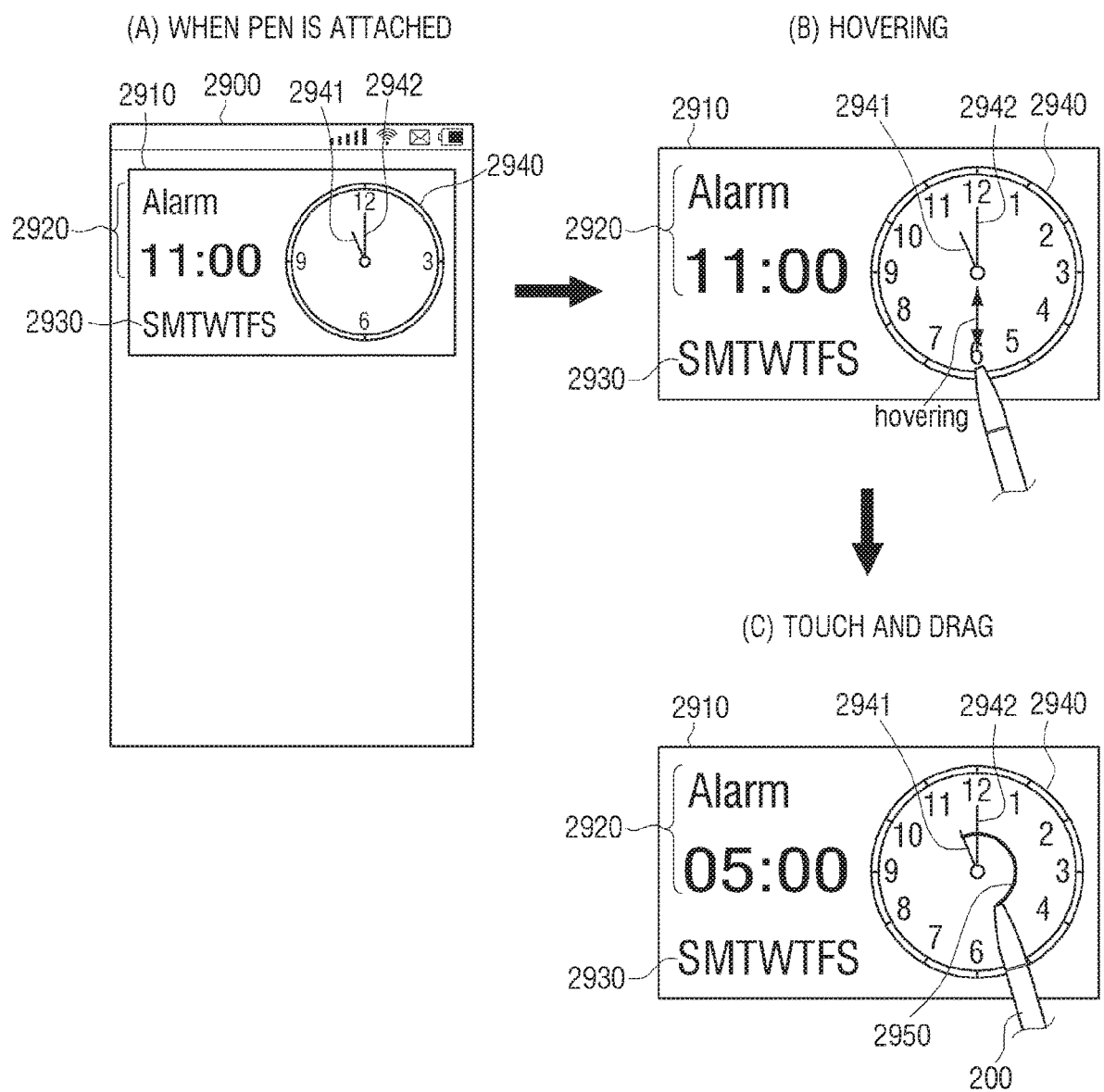

FIG. 29 is a view provided to explain another example of changing a widget according to an interaction mode. According to FIG. 29, when the pen is mounted (A), the display 110 displays a screen 2900 including a widget 2910.

The controller 130 operates in a general mode when the pen 200 is mounted on the user terminal device 100, and operates in a pen use mode when the pen 200 is detached from the user terminal device 100.

When there is a touch on a widget in a general mode, the controller 130 executes a program corresponding to the widget 2910. Accordingly, when an execution screen of the corresponding program is displayed, a user may change displayed contents of the widget 2910 by inputting various data related to the widget 2910 using the execution screen.

On the other hand, when a pen manipulation is input on the widget 2910 in a pen use mode, the controller 130 adjusts the setting data of the widget 2910 according to the pen manipulation, and changes the displayed contents of the widget 2910 according to the changed setting data.

FIG. 29 illustrates a case where a widget is an alarm widget 2910 including an analog clock 2940 which includes an hour hand 2941 and a minute hand 2942. A digital clock 2920, weekday information 2930, etc., may also be displayed in the alarm widget 2910.

When there is a touch on the alarm widget 2910 in a general mode, the controller 130 executes an alarm program and displays an execution screen, i.e., an alarm setting screen. A user may input various data such as a desired time, alarm frequency, alarm date, and bell sound on the alarm setting screen.

In a pen use mode, the controller 130 sets an alarm according to a pen manipulation on the alarm widget 2910, and changes displayed contents of the widget according to the set alarm.

In particular, the controller 130 may display only part of numbers (12, 3, 6, 9) indicating time in the analog clock 2940 of the widget 2910. Then, when there is a pen hovering (B), the entire numbers (1 through 12) may be displayed. In this state, a user may touch the hour hand 2941 and the minute hand 2942 using the pen 200, respectively, and drag 2950 them to a desired location.

When a pen manipulation to move at least one of the hour hand 2941 and the minute hand 2942 is input on the analog clock 2940, the controller 130 sets an alarm according to the time changed by the pen manipulation. Subsequently, the controller 130 may move at least one of the hour hand and the minute hand to the time when the alarm is set. FIG. 29 illustrates a state where the location of the hour hand 2941 is changed from 11 to 5, and the minute hand 2942 remains at 12. Accordingly, the alarm is set to 5 o'clock. When the alarm setting time is changed, the time of the analog clock 2940 and the digital clock 2920 is changed automatically.

A user may directly select a date where the user wishes to set off an alarm by touching the weekday information 2930 with the pen 200. The selected date may be displayed in a different color from the other dates. In addition, although not illustrated in FIG. 29, an area for selecting the morning and the afternoon, an area for selecting on/off of alarm, an area for selecting a bell sound may also be included in the widget 2910.

Figure 30:
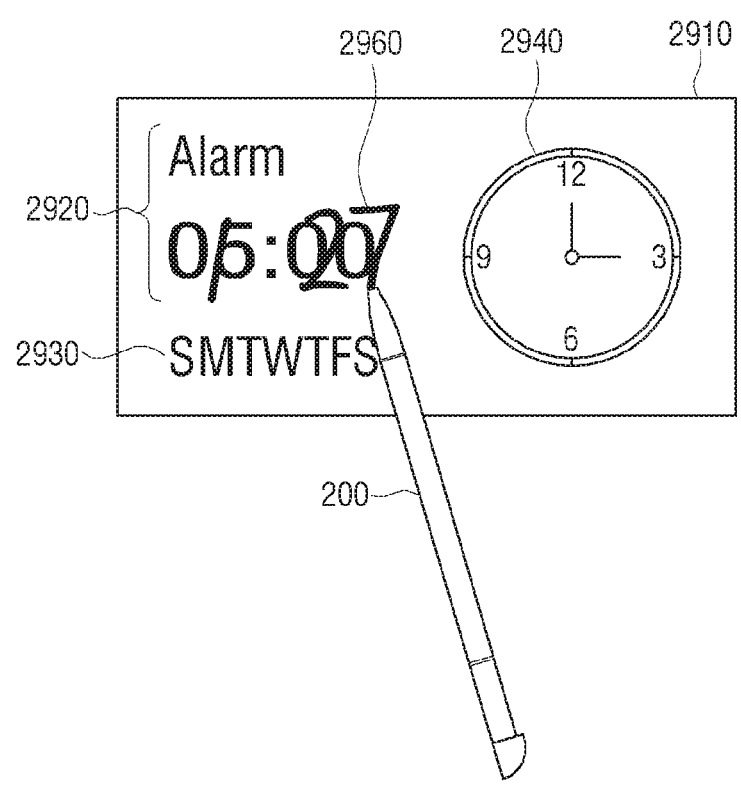

FIG. 30 is a view provided to explain another method for selecting an alarm in the alarm widget 2910. According to FIG. 30, a user may take a note regarding time information 2960 on the digital clock 2920 using the pen 200. FIG. 30 illustrates a case where '1' is written in the hour area and '27' is written in the minute area. The controller 130 recognizes the notes and sets an alarm setting time according to the recognition result. In addition, the controller 130 changes the displayed contents of the digital clock 2920 and the analog clock 2910 according to the set time.

As described above, an icon and a widget may be displayed differently depending on whether it is a general mode and a pen use mode, and their utilizing method may also be changed according to mode.

As described above, according to various exemplary embodiments, a user may select a desired control operation conveniently on the screen where objects are displayed, using various manipulation methods. Accordingly, user convenience in executing and using various programs can be improved significantly. Each of the above exemplary embodiments may be realized and applied individually, but they may also be combined and applied. In other words, a plurality of objects may be grouped in one user terminal device 100 and a plurality of control operations may be performed. Alternatively, a plurality of control operations may be matched with one of the objects, and various control operations may be selectively performed according to the direction or location of a user manipulation of selecting an object or the contents input by the user.

As described above, a user terminal device may be controlled in various ways according to a user body part or a pen. The example of such a control operation may combined and realized in various ways depending on the type of the user terminal device 100 and the characteristics of programs installed therein.

For example, as described above, a user terminal device may be realized as various types of apparatuses such as mobile phone, tablet PC, laptop PC, PDA, MP3 player, electronic album device, TV, PC, kiosk, etc. If a user terminal device is realized as an apparatus having various functions like a communication function, a content reproduction function, etc., such as mobile phone, tablet PC, etc., the user terminal device may further include other elements to perform such functions.

Figure 31:
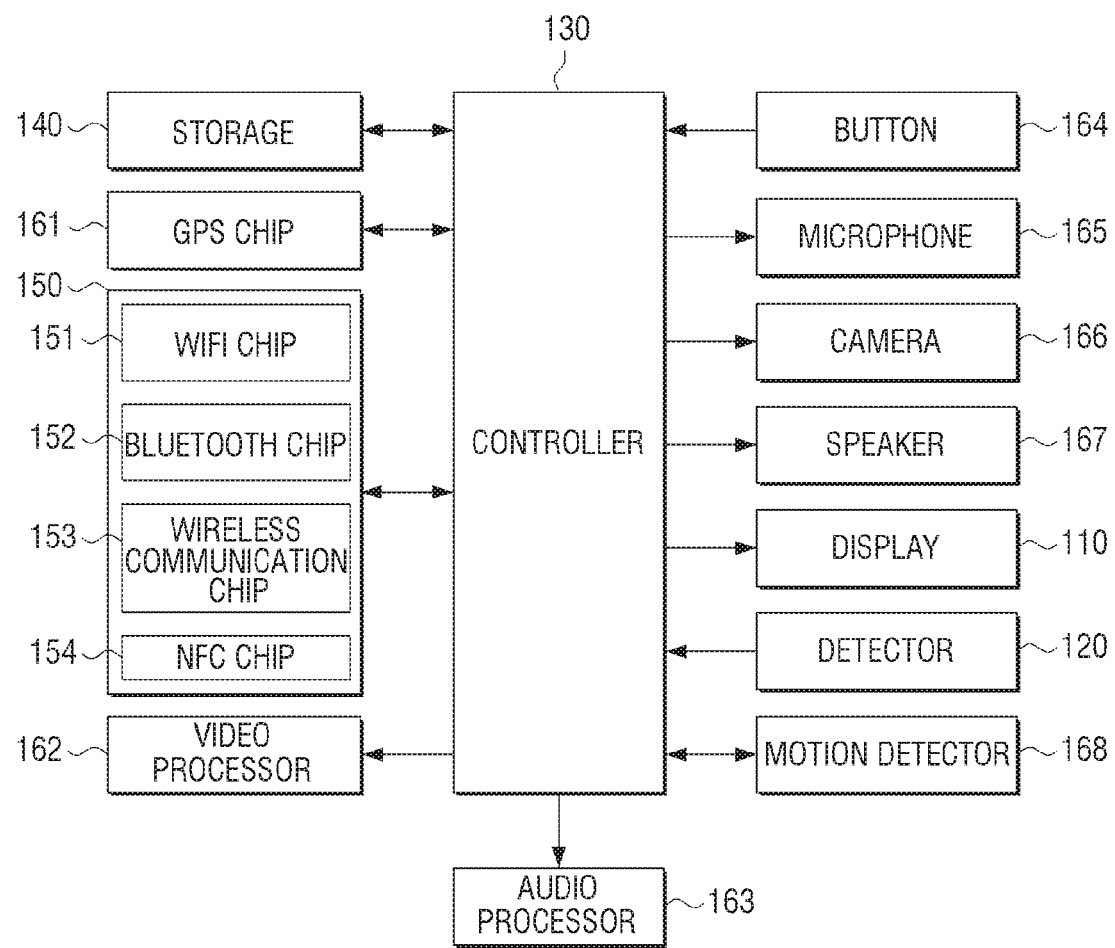
FIG. 31 is a block diagram provided to explain comprehensive configuration of a user terminal device according to various exemplary embodiments.

FIG. 31 is a block diagram illustrating an example of a user terminal device including various elements in comprehensive manner.

According to FIG. 31, the user terminal device 100 may include the display 110, the detector 120, the controller 130, the storage 140, a communicator 150, a Global Positioning System (GPS) chip 161, a video processor 162, an audio processor 163, a button 164, a microphone 165, a camera 166, a speaker 167, and a motion detector 168.

The display 110 and the detector 120 may be realized in the form of touch screen as described above, display various screens, and detect a user manipulation on the screen.

The controller 130 controls overall operations of the user terminal device using various programs and data stored in the storage 140. In particular, the controller 130 may detect whether the pen 200 is attached or detached, and display screens of various layouts according to the detection result.

As the display 110, the detector 120, and the controller 130 have already been described above, further description will not be provided.

The communicator 150 is an element which performs communication with various types of external apparatuses according to various types of communication methods. The communicator 150 includes a WiFi chip 151, a Bluetooth 152, a wireless communication chip 153, and an NFC chip 154.

The WiFi chip 151 and the Bluetooth chip 152 perform communication according to a WiFi method and a Bluetooth method, respectively. In the case of the WiFi chip 151 or the Bluetooth chip 152, various connection information such as SSID and a session key may be transmitted/received first for communication connection. Then, various information may be transmitted/received using the same. The wireless communication chip 153 represents a chip which performs communication according to various communication standards such as IEEE, Zigbee, $3^{rd}$ Generation (3G), $3^{rd}$ Generation Partnership Project (3GPP), Long Term Evolution (LTE), etc. The NFC chip 154 represents a chip which operates according to an NFC method which uses 13.56 MHz band among various RF-ID frequency bands such as 135 kHz, 13.56 MHz, 433 MHz, 860 through 960 MHz, 2.45 GHz, etc.

The controller 130 performs communication with various external apparatuses using the communicator 150. For example, the controller 130 may download an application, install the application in the storage 140, and display an object corresponding to the application. In this case, the corresponding application may be matched with a previously-used object.

In particular, the communicator 150 may perform communication with an external server. The server may be a server for providing a sharing service which shares a home screen including objects which are drawn directly by another user. In this case, when a command to share a home screen is input in the user terminal device 100, home screen data which constitutes the home screen produced by a user may be uploaded to the server using the communicator 150. Alternatively, new home screen data which is generated by another user may be transmitted from the server. When the new home screen data is downloaded, and if a user inputs a home screen change command to change the home screen by selecting the new home screen data, the controller 130 may display the new home screen based on the new home screen data. In addition, the communicator 150 may share home screen data by performing communication directly with an external terminal device of another user instead of the server.

The GPS chip 161 is an element to calculate the current location of the user terminal device 100 by receiving a GPS signal from a GPS satellite. When a navigation program is used or when it is necessary to figure out the current location of a user, the controller 130 may calculate the user location using the GPS chip 161.

The video processor 162 is an element to process contents received through the communicator 150 or video data included in the contents stored in the storage 140. The video processor 162 may perform various image processing with respect to video data such as decoding, scaling, noise filtering, frame rate conversion, resolution conversion, etc.

The audio processor 163 is an element to process contents received through the communicator 150 or audio data included in the contents stored in the storage 140. The audio processor 163 may perform various processing with respect to audio data such as decoding, amplifying, noise filtering, etc.

When a reproduction program with respect to multimedia contents is executed, the controller 130 drives the video processor 162 and the audio processor 163 to reproduce the corresponding contents. The display 110 may display an image frame which is generated by the video processor 162.

In addition, the speaker 167 outputs audio data generated by the audio processor 163.

The button 164 may be a button in various forms such as a mechanic button, a touch pad, a wheel, etc., which is formed on a certain area of the user terminal device 100 such as the front, side, or back of the exterior of the main body.

The microphone 165 is an element to receive a user voice or other sounds and convert the same into audio data. The controller 130 may use a user voice input through the microphone 165 during a call, or may convert the user voice into audio data and store the same in the storage 140.

The camera 166 is an element to photograph a still image or a video under the control of a user. A plurality of cameras 166 such as a front camera and a rear camera may be provided.

When the camera 166 and the microphone 165 are provided, the controller 130 may perform a control operation according to a user voice input through the microphone 165 and a user motion recognized by the camera 166. In other words, the user terminal device 100 may operate in a motion control mode or in a voice control mode. When the user terminal device 100 operates in the motion control mode, the controller 130 activates the camera 166 to photograph a user, trace a change in the user motion, and perform a corresponding control operation. When the user terminal device 100 operates in the voice control mode, the controller 130 may operate in the voice recognition mode where a user voice input through the microphone 165 is analyzed and a control operation is performed according to the analyzed user voice.

In the user terminal device 100 where the motion control mode or the voice control mode is supported, a voice recognition technology and a motion recognition technology may be used according to the above-described various exemplary embodiments. For example, if a user takes a motion of selecting an object displayed on the home screen or if a user utters a voice command corresponding to the object, it is determined that the corresponding object is selected, and a control operation matched with the object may be performed.

The motion detector 168 is an element to detect a motion of the main body of the user terminal device 100. In other words, the user terminal device 100 may rotate or tilt in various directions. The motion detector 168 may detect characteristics of motion, such as rotation direction, angle, tilt, etc., using at least one of various sensors like a geomagnetic sensor, a gyro sensor, an acceleration sensor, etc.

Although not illustrated in FIG. 31, depending on exemplary embodiments, the user terminal device 100 may further include a USB port where a USB connector can be connected, various external input ports for connection with various external terminals such as a headset, a mouse, LAN, etc., and a DMB chip which receives and processes a Digital Multimedia Broadcasting (DMB) signal.

Meanwhile, the operation of the controller 130 may be performed by executing various software stored in the user terminal device 100.

Figure 32:
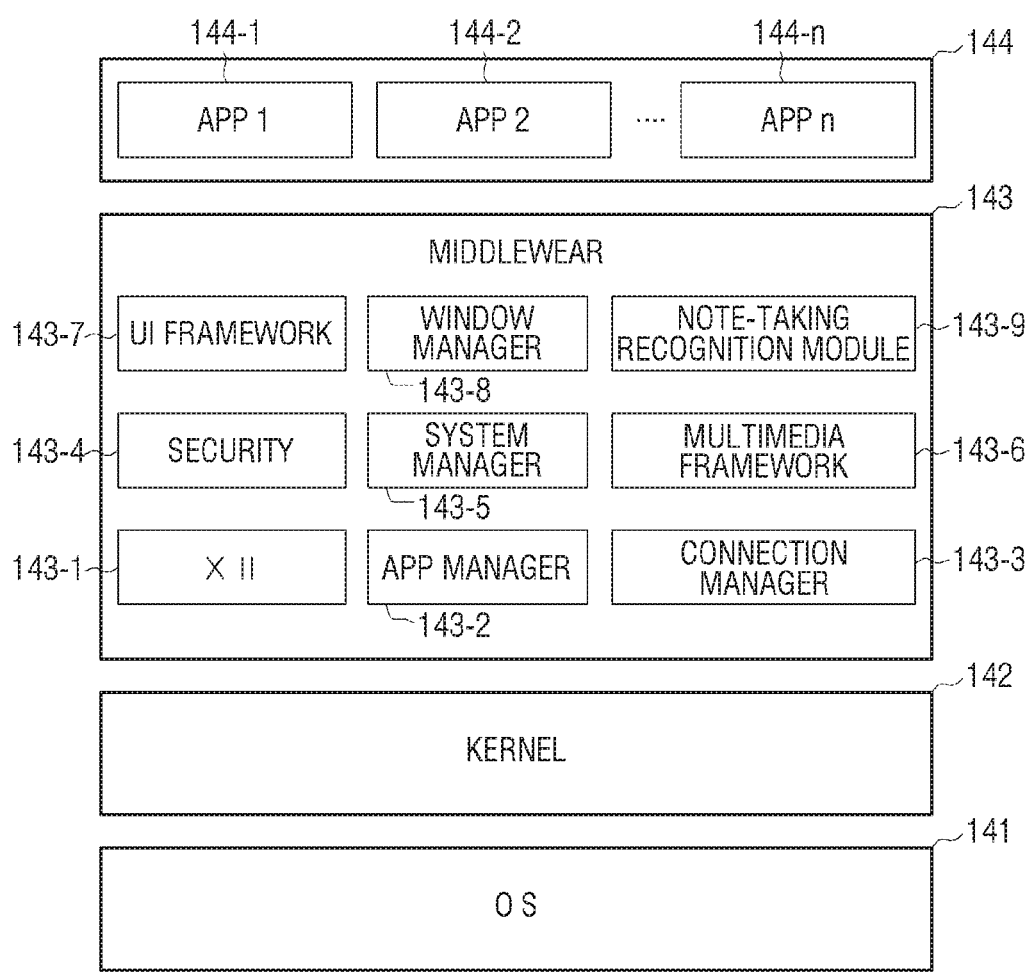
FIG. 32 is a view illustrating an example of configuration of software which can be used in a user terminal device according to an exemplary embodiment.

FIG. 32 is a view illustrating an example of a software structure which is used by the user terminal device 100. The software of FIG. 32 may be stored in the storage 140, but is not limited thereto. The software of FIG. 32 may be stored in various types of storage device which are used in the user terminal device 100. According to FIG. 32, the user terminal device 100 may store software including an Operating System (OS) 141, a kernel 142, middleware 143, an application 144, etc.

The OS 141 controls overall operations and manages functions of hardware. In other words, the OS 141 is responsible for basic functions of managing hardware, memory, security, etc.

The kernel 142 serves as a path which transmits various signals detected by the detector 120, etc., to the middleware 143.

The middleware 143 includes various software modules which control the operations of the user terminal device 100. According to FIG. 32, the middleware 143 includes an X11 module 143-1, an APP manager 143-2, a connection manager 143-3, a security module 143-4, a system manager 143-5, a multimedia framework 143-6, a UI framework 143-7, a window manage 143-8, and a note-taking recognition module 143-9.

The X11 module 143-1 is a module which receives various event signals from various hardware of the user terminal device 100. The event may include various events such as an event where a user manipulation is detected, an event where a system alarm occurs, a event where a specific program is executed or terminated, etc.

The APP manager 143-2 is a module which manages the execution state of various applications installed in the storage 140. When an event where an application execution command is input is detected from the X11 module 143-2, the APP manager 143-2 calls and executes an application corresponding to the event. In other words, when an event where at least one object is selected on the home screen is detected, the APP manager 143-2 calls and executes an application corresponding to the object.

The connection manager 143-3 is a module which supports wired or wireless network connection. The connection manager 143-3 may include various specific modules such as a DNET module, an UPnP module, etc.

The security module 143-4 is a module which supports certification of hardware, permission of request, security storage, and so on.

The system manager 143-5 monitors the state of each element of the user terminal device 100, and provides the monitoring result to other modules. For example, if a battery is running short, there is an error, or communication connection is cut off, the system manager 143-5 may output an alarm message or an alarm sound by providing the monitoring result to the UI framework 143-7.

The multimedia framework 143-6 is a module which reproduces a multimedia content stored in the user terminal device 100, or provided by an external source. The multimedia framework 143-6 may include a player module, a camcorder module, a sound processing module, and so on. Accordingly, the multimedia framework 143-6 may perform the operation of reproducing various multimedia contents and generating and reproducing screen and sound.

The UI framework 143-7 is a module to provide various UIs. The UI framework 143-7 may include an image compositor module for configuring various objects, a coordinates compositor module for calculating a coordinates where an object is to be displayed, a rendering module for rendering the configured object on the calculated coordinates, a 2D/3D toolkit for providing a tool for configuring a UI in the 2D or 3D form, etc.

The window manager 143-8 may detect a touch event using a user body part or pen or other input events. When such an event is detected, the window manager 143-8 transmits an event signal to the UI framework 142-7 so that an operation corresponding to the event is performed.

The note-taking recognition module 143-9 is a module to parse and recognize a trace that a user draws on the surface of the display 110. The note-taking recognition module 143-9 receives a coordinates value of points touched by the pen recognition panel 121 and stores the coordinates values of the touched points as a stroke. In addition, the note-taking recognition module 143-9 may generate a stroke array using the stroke. Subsequently, the note-taking recognition module 143-9 may recognize a note-taking by comparing a pre-stored note-taking library with the generated stroke array. The recognized note-taking is provided to the application manager 143-2, and the application manager 143-2 provides the note-taking to an application corresponding to the object where the user note-taking occurs. Accordingly, as described above, the application may perform a control operation based on the recognized note-taking.

Meanwhile, if a user touches or draws the surface of the display 110 using various inputters such as a user finger or pen, the UI framework 143-7 may draw various graphic lines according to the user manipulation. In particular, if a user draws a picture on the screen using the pen 200, the controller 130 draws a graphic line on each point where the pen 200 passes through according to the execution of the UI framework 143-7. The thickness of the line may vary according to the pressure of the pen 200 on the screen or the size of the screen touched by the pen 200. The color and shape of the line may also vary according to a user setting.

In addition, when an event of detaching or attaching a pen occurs, the UI framework 143-7 performs the operation of changing a layout of the UI screen which is currently displayed.

The application module 144 includes applications 144-1 through 144-n to support various functions. For example, program modules to provide various services such as a navigation program module, a game module, an electronic book module, a calendar module, an alarm management module, etc., may be included. The applications may be installed as a default, or may be installed and used arbitrarily during the usage process.

The software structure of FIG. 32 is only an example, so the software structure is not limited thereto. Accordingly, part of the software structure may be omitted, changed, or added, if necessary. For example, the storage 140 may further include various programs like a sensing module to analyze signals sensed by various sensors, a messenger program, a messaging module such as Short Message Service (SMS) & Multimedia Message Service (MMS) program, an e-mail program, etc., a call info aggregator program module, a VoIP module, a web browser module, etc.

As described above, according to various exemplary embodiments, the applicability of a user terminal device may be improved significantly. In particular, where interaction of accurate pen manipulation is allowed in a screen, a user may conveniently use a pen in various ways.

The method of controlling a user terminal device according to the above various exemplary embodiments may be stored in a non-transitory readable medium. The non-transitory readable medium may be mounted and used in various apparatuses.

For example, a program code for displaying a screen, when a pen mounted on the user terminal device is detached, changing the layout of the screen to a layout corresponding to a pen use mode, when the pen is mounted on the user terminal device again, restoring the layout of the screen to its original state may be stored and provided in a non-transitory readable medium.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

The foregoing embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims. Many alternatives, modifications, and variations will be apparent to those skilled in the art.

What is claimed is:

1. An electronic device comprising:
   a memory storing instructions;
   a display;
   a detector including a touch panel and a pen recognition panel, wherein the touch panel recognizes a touch input and the pen recognition panel recognizes a pen input; and
   a processor configured to execute the instructions to:
      control the display to display a plurality of objects on a first area of the display and a plurality of indicators on a second area of the display, wherein the plurality of objects are related to a plurality of applications installed in the electronic device,
      based on identifying the touch input from an edge area of the display towards a center area of the display, control the display to display a first screen on the first area of the display while the plurality of indicators are displayed on the second area of the display, and
      based on identifying the pen input, by a pen, from the edge area of the display towards the center area of the display, control the display to display a second screen on the first area of the display while the plurality of indicators are displayed on the second area of the display,
   wherein the second screen displays a plurality of notification items including a first notification item and a second notification item,
   wherein the first notification item corresponds to a first application among the plurality of applications,
   wherein the second notification item corresponds to a second application among the plurality of applications, and
   wherein the processor is further configured to:
      based on a first text being written on the first notification item among the plurality of notification items by using the pen, control the display to display a third screen on the first area of the display and perform a first control operation corresponding to the first application and the first text, and
      based on the first text being written on the second notification item among the plurality of notification items by using the pen, control the display to display a fourth screen on the first area of the display and perform a second control operation corresponding to the second application and the first text, and
   wherein the first control operation is different from the second control operation.

2. The electronic device as claimed in claim 1, wherein the processor is further configured to:
   identify whether the pen is mounted on the electronic device,
   based on the pen mounted on the electronic device being identified, identify a dragging manipulation as a touch dragging manipulation, and
   based on the pen removed from the electronic device being identified, identify the dragging manipulation as a pen dragging manipulation.

3. The electronic device as claimed in claim 1, wherein the processor is configured to, based on a pen manipulation in a predetermined pattern being identified on the second screen, perform a control operation according to the predetermined pattern.

4. The electronic device as claimed in claim 1, wherein the processor is configured to:
   based on the first text being written on the first notification item, execute the first application corresponding to the first notification item among the plurality of applications, perform the first operation of the first application based on the written first text and control the display to display a first result of the performed first operation of the first application, and
   based on the first text being written on the second notification item, execute the second application corresponding to the second notification item among the plurality of applications, perform the second operation of the second application based on the written first text and control the display to display a second result of the performed second operation of the second application.

5. The electronic device as claimed in claim 1, wherein the first screen and the second screen are different from each other in terms of at least one of a number of menu items, a size of a menu item or a layout.

6. The electronic device as claimed in claim 5, wherein the processor is configured to:
   reduce a size of a menu item displayed on the second screen, and
   increase the number of total menu items displayed on the second screen.

7. The electronic device as claimed in claim 1, wherein the processor is further configured to:
   based on the touch input identified, arrange the plurality of objects according to a first layout, and
   based on the pen input identified, re-arrange the plurality of objects according to a second layout.

8. The electronic device as claimed in claim 7, wherein the first area includes a menu area including at least one menu which is selectable by the pen and a content display area including at least one content,
wherein the processor is further configured to:
based on the pen being removed from the electronic device, reduce a size of the menu area and enlarge a size of the content display area to display the first area according to the second layout, and
based on the pen being mounted in the electronic device, restore the size of the menu area and the size of the content display area according to the first layout.

9. The electronic device as claimed in claim 8, wherein the processor is further configured to, based on an indicator corresponding to a current mode of the electronic device being selected by the pen, change a shape of the selected indicator to a shape corresponding to another mode, and convert the current mode of the electronic device to the another mode.

10. The electronic device as claimed in claim 1, wherein each indicator among the plurality of indicators indicates an operation state of the electronic device.

11. A method for controlling an electronic device including a touch panel and a pen recognition panel, wherein the touch panel recognizes a touch input and the pen recognition panel recognizes a pen input, the method comprising:
displaying a plurality of objects on a first area of a display and a plurality of indicators on a second area of the display, wherein the plurality of objects are related to a plurality of applications installed in the electronic device,
based on identifying the touch input from an edge area of the display towards a center area of the display, displaying a first screen on the first area of the display while the plurality of indicators are displayed on the second area of the display, and
based on identifying the pen input, by a pen, from the edge area of the display towards the center area of the display, displaying a second screen on the first area of the display while the plurality of indicators are displayed on the second area of the display,
wherein the second screen displays a plurality of notification items including a first notification item and a second notification item,
wherein the first notification item corresponds to a first application among the plurality of applications, and
wherein the second notification item corresponds to a second application among the plurality of applications,
wherein the method further comprises:
based on a first text being written on the first notification item among the plurality of notification items by using the pen, displaying a third screen on the first area of the display and performing a first control operation corresponding to the first application and the first text, and
based on the first text being written on the second notification item among the plurality of notification items by using the pen, displaying a fourth screen on the first area of the display and performing a second control operation corresponding to the second application and the first text, and
wherein the first control operation is different from the second control operation.

12. The method as claimed in claim 11, further comprising:
identifying whether the pen is mounted on the electronic device,
based on the pen mounted on the electronic device being identified, identifying a dragging manipulation as a touch dragging manipulation, and based on the pen removed from the electronic device being identified, identifying the dragging manipulation as a pen dragging manipulation.

13. The method as claimed in claim 11, further comprising:
based on a pen manipulation in a predetermined pattern being identified on the second screen, performing a control operation according to the predetermined pattern.

14. The method as claimed in claim 11, further comprising:
based on the first text being written on the first notification item, executing the first application corresponding to the first notification item among the plurality of applications, performing the first operation of the first application based on the written first text and displaying a first result of the performed first operation of the first application, and
based on the first text being written on the second notification item, executing the second application corresponding to the second notification item among the plurality of applications, performing the second operation of the second application based on the written first text and displaying a second result of the performed second operation of the second application.

15. The method as claimed in claim 11, wherein the first screen and the second screen are different from each other in terms of at least one of a number of menu items, a size of a menu item or a layout.

16. The method as claimed in claim 15, further comprising:
reducing a size of a menu item displayed on the second screen, and
increasing the number of total menu items displayed on the second screen.

17. The method as claimed in claim 11, further comprising:
based on the touch input identified, arranging the plurality of objects according to a first layout, and
based on the pen input identified, re-arranging the plurality of objects according to a second layout.

18. The method as claimed in claim 17,
wherein the first area includes a menu area including at least one menu which is selectable by the pen and a content display area including at least one content,
wherein the method further comprises:
based on the pen being removed from the electronic device, reducing a size of the menu area and enlarging a size of the content display area to display the first area according to the second layout, and
based on the pen being mounted in the electronic device, restoring the size of the menu area and the size of the content display area according to the first layout.

19. The method as claimed in claim 18, further comprising:
based on an indicator corresponding to a current mode of the electronic device being selected by the pen, changing a shape of the selected indicator to a shape corresponding to another mode, and converting the current mode of the electronic device to the another mode.

20. The method as claimed in claim 11, wherein each indicator among the plurality of indicators indicates an operation state of the electronic device.

* * * * *